(12) United States Patent
Morimoto et al.

(10) Patent No.: US 9,995,512 B2
(45) Date of Patent: Jun. 12, 2018

(54) MAGNETIC REFRIGERATION SYSTEM WITH SINGLE DIRECTION COOLANT DEVICES AND VEHICLE AIR CONDITIONING DEVICE APPLICATIONS

(71) Applicant: DENSO CORPORATION, Kariya, Aichi-pref. (JP)

(72) Inventors: Tsuyoshi Morimoto, Obu (JP); Naoki Watanabe, Kariya (JP); Shinichi Yatsuzuka, Nagoya (JP); Katzutoshi Nishizawa, Toyoake (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/253,975

(22) Filed: Sep. 1, 2016

(65) Prior Publication Data
US 2016/0370037 A1  Dec. 22, 2016

Related U.S. Application Data

(62) Division of application No. 13/976,543, filed as application No. PCT/JP2012/000412 on Jan. 24, 2012, now abandoned.

(30) Foreign Application Priority Data

Jan. 27, 2011 (JP) ................................. 2011-014914
May 17, 2011 (JP) ................................. 2011-110206
Dec. 22, 2011 (JP) ................................. 2011-281288

(51) Int. Cl.
*F25B 21/00* (2006.01)
*B60H 1/32* (2006.01)
(Continued)

(52) U.S. Cl.
CPC ......... *F25B 21/00* (2013.01); *B60H 1/00864* (2013.01); *B60H 1/00885* (2013.01);
(Continued)

(58) Field of Classification Search
CPC ....................... F25B 21/00; F25B 2321/0022; F25B 47/022; F25B 13/00; F25B 41/04; Y02B 30/66; F01M 5/007; F28F 27/02
(Continued)

(56) References Cited

U.S. PATENT DOCUMENTS 4,281,969 A * 8/1981 Doub, Jr. ................. F04B 19/24
417/52
6,526,759 B2 * 3/2003 Zimm ....................... F25B 21/00
62/3.1
(Continued)

FOREIGN PATENT DOCUMENTS

FR 2943407 A1 9/2010
JP H11-014166 1/1999
(Continued)

OTHER PUBLICATIONS

Naoki Hirano, "Development of Magnetic Refrigeration System", Sep. 2003, with partial English translation.
(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

A magnetic refrigeration system constructed in such a way that a refrigerant transfer part transfers refrigerant from a first refrigerant discharge part of one refrigerant port to a first refrigerant circulation circuit after a magnetic field is applied to a magnetic working material by a magnetic field applying and removing part and that the refrigerant transfer
(Continued)

part transfers refrigerant from a second refrigerant discharge part of other refrigerant port to a second refrigerant circulation circuit after the magnetic field is removed from the magnetic working material by the magnetic field applying and removing part.

11 Claims, 21 Drawing Sheets

(51) Int. Cl.
  *B60H 1/00* (2006.01)
  *B60H 1/03* (2006.01)
(52) U.S. Cl.
  CPC .............. *B60H 1/03* (2013.01); *B60H 1/32* (2013.01); *F25B 2321/002* (2013.01); *F25B 2321/0022* (2013.01); *Y02B 30/66* (2013.01)
(58) Field of Classification Search
  USPC .............................. 62/3.1, 467, 3.3
  See application file for complete search history.

(56) References Cited

U.S. PATENT DOCUMENTS

| | | | |
|---|---|---|---|
| 2005/0167631 A1 | 8/2005 | Horton | |
| 2007/0144594 A1* | 6/2007 | Moon | F16K 11/074 137/625.46 |
| 2011/0192836 A1 | 8/2011 | Muller et al. | |
| 2011/0314836 A1 | 12/2011 | Heitzler et al. | |

FOREIGN PATENT DOCUMENTS

| | | |
|---|---|---|
| JP | H11-014166 A | 1/1999 |
| JP | 2006-056274 A | 3/2006 |
| JP | 2006-131180 A | 5/2006 |
| JP | 2010-196914 A | 9/2010 |
| WO | WO-03/016794 A1 | 2/2003 |
| WO | WO-2010-043781 A1 | 4/2010 |
| WO | WO-2010/106242 A1 | 9/2010 |

OTHER PUBLICATIONS

Shunsuke Kito et al, "High Frequency for AMR Cycle and Heat Transfer Fluid Condition,", 77th, 2007 Autumn, Cryogenics and Superconductivity Society of Japan, with partial English translation.
International Search Report for PCT/JP2012/000412, ISA/JP, dated May 1, 2012.
Written Opinion of the ISA for PCT/JP2012/000412, ISA/JP, dated May 1, 2012, with English translation.
Office Action for parallel Japanese Patent Application No. 2011-281288 dated Jun. 18, 2013 (3 pages), with its English translation (4 pages).
Office Action dated Jan. 20, 2015 in corresponding Chinese Application No. 201280006669.
Extended European Search Report issued in EP Application No. 12739004.5 dated May 27, 2014.

* cited by examiner

MAGNETIC REFRIGERATION SYSTEM WITH SINGLE DIRECTION COOLANT DEVICES AND VEHICLE AIR CONDITIONING DEVICE APPLICATIONS

CROSS-REFERENCE TO RELATED APPLICATIONS

This application is a divisional Application of U.S. patent application Ser. No. 13/976,543 filed on Jun. 27, 2013, which is a National Stage of International Application No. PCT/JP2012/000412, filed Jan. 24, 2012, and is based on Japanese Patent Application No. 2011-14914 filed on Jan. 27, 2011, Japanese Patent Application No. 2011-110206 filed on May 17, 2011, and Japanese patent Application No. 2011-281288 filed on Dec. 22, 2011, and the contents of those are incorporated herein by reference in their entirety.

FIELD

The present disclosure relates to a magnetic refrigeration system and a vehicle air conditioning device to which the magnetic refrigeration system is applied.

BACKGROUND

This section provides background information related to the present disclosure which is not necessarily prior art.

There is proposed a magnetic refrigeration system utilizing a phenomenon (magnetocaloric effect) such that when a magnetic field is applied to a magnetic working material such as a magnetic material, the magnetic working material generates heat and such that when the magnetic field is removed from the magnetic working material, the magnetic working material is decreased in temperature (see, for example, patent document 1).

The magnetic refrigeration system of this patent document 1 is constructed of: a magnetic working material mounted in a railroad vehicle; a strong magnetic field generating device for applying a magnetic field to the magnetic working material; a first heat exchange flow passage through which a heating medium for transferring the heat (hot heat) of the magnetic working material flows, the heat (hot heat) being increased when the magnetic field applied to the magnetic working material by the strong magnetic field generating device is increased; a second heat exchange flow passage through which the heating medium for transferring the heat (cold heat) of the magnetic working material flows, the heat (cold heat) being decreased when the magnetic field applied to the magnetic material by the strong magnetic field generating device is decreased; and pumps and heat exchangers arranged in the respective heat exchange flow passages.

When the magnetic field applied by the strong magnetic field generating device is increased, the pump disposed in the first heat exchange flow passage is activated to make the heating medium whose temperature is increased by the hot heat of the magnetic working material exchange heat with air outside a passenger compartment by the heat exchanger. On the other hand, when the magnetic field applied by the strong magnetic field generating device is decreased, the pump disposed in the second heat exchange flow passage is activated to make the heating medium whose temperature is decreased by the cold heat of the magnetic working material exchange heat with air inside the passenger compartment by the heat exchanger.

By the way, in the magnetic refrigeration system of the patent document 1, the strong magnetic field generating device is constructed of a superconducting coil or the like so as to increase a temperature change in the magnetic working material and the application of the magnetic refrigeration system is limited to special uses. Hence, it is difficult to apply the magnetic refrigeration system to a general-purpose product such as a vehicle air conditioning device.

As a means for solving an issue like this has been known an AMR (Active Magnetic Refrigerator) type magnetic refrigeration system in which: after a magnetic field applied to a magnetic working material is increased, refrigerant (magnetic heat transporting medium) is transferred to one end (high temperature end) in the magnetic working material; and after the magnetic field applied to the magnetic working material is decreased, the refrigerant is transferred to the other end (low temperature end) in the magnetic working material, whereby the cold heat and the hot heat generated by the magnetocaloric effect are stored in the magnetic working material itself.

The AMR type magnetic refrigeration system generally has a container filled with a magnetic working material and having a refrigerant flow passage through which a refrigerant flows and reciprocally transfers the refrigerant between one end and the other end of the container according to applying and removing a magnetic field to and from the magnetic working material.

The following four processes are repeated: (i) applying the magnetic field to the magnetic working material; (ii) transporting hot heat generated in the magnetic working material to the one end (high temperature end) of the container by the refrigerant; (iii) removing the magnetic field from the magnetic working material; and (iv) transporting cold heat generated in the magnetic working material to the other end (low temperature end) of the container by the refrigerant.

In this way, a temperature gradient is produced in the magnetic working material in the container and hence a large temperature difference is produced between a high temperature end and a low temperature end in the container.

Here, it may be thought that the AMR type magnetic refrigeration system is applicable to the magnetic refrigeration system of the patent document 1. However, in this case, there is presented an issue that the COP (Coefficient Of Performance) of refrigeration of the magnetic refrigeration system is reduced. Here, the COP expresses a cooling or heating capacity per 1 kW of power consumption.

This is because a refrigerant flowing through a refrigerant flow passage is made to exchange heat with a heating medium flowing through a heat exchange flow passage, around a magnetic working material, in the case where the AMR type magnetic refrigeration system is applied to the magnetic refrigeration system of the patent document 1. Hence the heat of the magnetic working material is transmitted indirectly to the heating medium flowing through the heat exchange flow passage. At this time, a heat exchange loss is increased between the magnetic working material and the heating medium.

PRIOR ART DOCUMENT

Patent Document

Patent document 1: JP-A-2006-56274

SUMMARY

This section provides a general summary of the disclosure, and is not a comprehensive disclosure of its full scope or all of its features.

An object of the present disclosure is to provide a magnetic refrigeration system and a vehicle air conditioning device to which the magnetic refrigeration system is applied.

A magnetic refrigeration system according to one example of the present disclosure is provided with: a cylindrical container having a plurality of working chambers formed therein radially in a circumferential direction, the plurality of working chambers having a magnetic working material having a magnetocaloric effect arranged therein and having refrigerant flowing therethrough; a magnetic field applying and removing part which repeats applying and removing a magnetic field to and from the magnetic working material; a first refrigerant circulation circuit constructed in such a way that the refrigerant flowing out of a refrigerant discharge part of one refrigerant port flows through a first heat exchanger and returns to a refrigerant suction part of the one refrigerant port, of the one and other refrigerant ports respectively disposed on end faces of the container in a longitudinal direction; a second refrigerant circulation circuit constructed in such a way that the refrigerant flowing out of a refrigerant discharge part of the other refrigerant port flows through a second heat exchanger and returns to a refrigerant suction part of the other refrigerant port, of the one and the other refrigerant ports; and a refrigerant transfer part which transfers the refrigerant between the one refrigerant port and the other refrigerant port, wherein after the magnetic field is applied to the magnetic working material by the magnetic field applying and removing part, the refrigerant transfer part transfers the refrigerant from the other refrigerant port to the one refrigerant port, and wherein after the magnetic field is removed from the magnetic working material by the magnetic field applying and removing part, the refrigerant transfer part transfers the refrigerant from the one refrigerant port to the other refrigerant port.

Accordingly, after the magnetic field is applied to the magnetic working material, the refrigerant is transferred from the other refrigerant port to the one refrigerant port in the working chambers, whereby the refrigerant near the one refrigerant port, whose temperature is increased by hot heat of the magnetic working material generated by applying the magnetic field to the magnetic working material, can be made to flow into the first heat exchanger via the first refrigerant circulation circuit.

Further, after the magnetic field is removed from the magnetic working material, the refrigerant is transferred from the one refrigerant port to the other refrigerant port in the working chambers, whereby the refrigerant near the other refrigerant port, whose temperature is decreased by cold heat of the magnetic working material generated by removing the magnetic field from the magnetic working material, can be made to flow into the second heat exchanger via the second refrigerant circulation circuit.

In this way, the refrigerant whose temperature is increased by the hot heat generated in the magnetic working material can be made to flow directly into the first heat exchanger and the refrigerant whose temperature is decreased by the cold heat generated in the magnetic working material can be made to flow directly into the second heat exchanger. Hence, a heat exchange loss can be reduced when the hot heat and the cold heat generated in the magnetic working material are transported, and hence the COP of the magnetic refrigeration system can be improved.

In this regard, when the refrigerant is transferred from the other refrigerant port to the one refrigerant port in the working chambers, it follows that the refrigerant flowing through the second heat exchanger flows into the working chambers via the other refrigerant port from the second refrigerant circulation circuit. Further, when the refrigerant is transferred from the one refrigerant port to the other refrigerant port in the working chambers, it follows that the refrigerant flowing through the first heat exchanger flows into the working chambers via the one refrigerant port from the first refrigerant circulation circuit.

In particular, by making the volume of a space constructing each of the refrigerant suction part and the refrigerant discharge part smaller than the volume of the refrigerant discharged at one time in the refrigerant transfer part, it is possible to prevent the refrigerant, whose temperature is increased by the hot heat generated in the magnetic working material, and the refrigerant, whose temperature is decreased by the cold heat generated in the magnetic working material, from remaining in the container. In other words, it is possible to efficiently discharge the refrigerant, whose temperature is increased by the hot heat generated in the magnetic working material, and the refrigerant, whose temperature is decreased by the cold heat generated in the magnetic working material, to the outside.

Further, the refrigerant suction part is provided with a suction valve opened when the refrigerant is sucked into the working chambers, and the refrigerant discharge part is provided with a discharge valve opened when the refrigerant is discharged from the working chambers.

According to this, after the magnetic field is applied to the magnetic working material, the refrigerant near the one refrigerant port, whose temperature is increased by the hot heat generated in the magnetic working material by applying the magnetic field, can be made to surely flow into the first heat exchanger via the first refrigerant circulation circuit and the refrigerant flowing out of the second heat exchanger can be sucked into the working chambers from the other refrigerant port.

Further, after the magnetic field is removed from the magnetic working material, the refrigerant near the other refrigerant port, whose temperature is decreased by the cold heat generated in the magnetic working material by removing the magnetic field, can be made to surely flow into the second heat exchanger via the second refrigerant circulation circuit and the refrigerant flowing out of the first heat exchanger can be sucked into the working chambers from the one refrigerant port.

Still further, the discharge valve is arranged at a position nearer to the working chambers than the suction valve is in the longitudinal direction of the container.

In this way, when the discharge valve is arranged in the vicinity of the working chambers, it is possible to prevent an unnecessary heat exchange between the refrigerant remaining around the suction valve and the refrigerant discharged from the working chambers via the discharge valve. This can reduce a heat exchange loss when the hot heat and the cold heat generated in the magnetic working material are transported, and hence can improve the COP of the magnetic refrigeration system.

Still further, of the suction valve and the discharge valve, at least the suction valve is constructed of a rotary valve having a valve plate and a rotary disk, the valve plate being arranged adjacently to the working chambers and having a communication hole communicating with an interior of the working chambers, the rotary disk rotating in a circumferential direction of the container to thereby open or close the communication hole.

According to this, it is possible to prevent the refrigerant from remaining around the suction valve and to prevent an unnecessary heat exchange between the refrigerant remaining around the suction valve and the refrigerant discharged from the working chambers via the discharge valve. This can reduce a heat exchange loss when the hot heat and the cold heat generated in the magnetic working material are transported, and hence can improve the COP of the magnetic refrigeration system.

Still further, when the rotary valve is constructed in such a way that the rotary disk rotates by the use of power for driving the magnetic field applying and removing part, the magnetic refrigeration system can be realized by a simple construction.

Still further, each of the refrigerant suction part and the refrigerant discharge part in the one refrigerant port is provided with a first backward flow preventing part for allowing the refrigerant to flow in one direction in order of the refrigerant discharge part, a refrigerant flow-in port in the first heat exchanger, a refrigerant flow-out port in the first heat exchanger, and the refrigerant suction part, and each of the refrigerant suction part and the refrigerant discharge part in the other refrigerant port is provided with a second backward flow preventing part for allowing the refrigerant to flow in one direction in order of the refrigerant discharge part, a refrigerant flow-in port in the second heat exchanger, a refrigerant flow-out port in the second heat exchanger, and the refrigerant suction part.

This can also make the refrigerant near the one refrigerant port, whose temperature is increased by the hot heat generated in the magnetic working material by applying the magnetic field after the magnetic field is applied to the magnetic working material, surely flows into the first heat exchanger via the first refrigerant circulation circuit and can suck the refrigerant flowing out of the second heat exchanger into the working chambers from the other refrigerant port.

Further, this can make the refrigerant near the other refrigerant port, whose temperature is decreased by the cold heat generated in the magnetic working material by removing the magnetic field after the magnetic field is removed from the magnetic working material, surely flows into the second heat exchanger via the second refrigerant circulation circuit and can suck the refrigerant flowing out of the first heat exchanger into the working chambers from the one refrigerant port.

Still further, when at least one of the first backward flow preventing part and the second backward flow preventing part is constructed of a fluid diode in which resistance is smaller in a forward direction of a flow of the refrigerant than in a backward direction of the flow of the refrigerant, the magnetic refrigeration system can be realized by a simple construction.

Still further, when the refrigerant suction part and the refrigerant discharge part are disposed plurally in correspondence to the plurality of working chambers, it is preferable that the refrigerant suction parts are disposed in such a way as to be positioned on a same circumference when viewed from the longitudinal direction of the container and that the refrigerant discharge parts are disposed in such a way as to be positioned on a same circumference when viewed from the longitudinal direction of the container.

Specifically, the magnetic field applying and removing part is constructed of a magnetic field generating part, a rotary shaft for rotatably supporting the magnetic field generating part, and a drive part for driving the rotary shaft, and the magnetic field generating part is disposed in such a way as to periodically come near to the magnetic working material according to the rotation of the rotary shaft. This makes it possible to periodically repeat applying and removing the magnetic field to and from the magnetic working material by the magnetic field applying and removing part.

Still further, the magnetic refrigeration system is provided with a power transmission mechanism for transmitting power by the drive part to the refrigerant transfer part. The refrigerant transfer part reciprocally transfers the refrigerant between the one refrigerant port and the other refrigerant port by the power transmitted via the power transmission mechanism.

In this way, when the magnetic refrigeration system employs a construction in which the refrigerant transfer part is driven by the power of the drive part of the magnetic field applying and removing part, the drive source can be common between the refrigerant transfer part and the magnetic field applying and removing part. Hence, the magnetic refrigeration system can be realized by a simple construction. Moreover, power consumption in the magnetic refrigeration system can be restricted from increasing, and hence can further improve the COP of the magnetic refrigeration system.

Still further, it is preferable that the refrigerant transfer part is constructed of a multi-cylinder type piston pump having a plurality of cylinders and a plurality of pistons, corresponding to the plurality of working chambers.

Still further, when a vehicle air conditioning device to which the magnetic refrigeration system described above is applied includes a case constructing an air flow passage for blown air to be blown into a passenger compartment. A heating heat exchanger for heating the blow air to be blown into the passenger compartment is constructed by the first heat exchanger, and a cooling heat exchanger for cooling the blow air to be blown into the passenger compartment is constructed by the second heat exchanger. Thus, the vehicle air conditioning device can cool and heat the interior of the passenger compartment.

Specifically, when the first heat exchanger is arranged downstream of the second heat exchanger in a flow of the blown air in the case, the first heat exchanger can heat the blown air, which is cooled and dehumidified by the second heat exchanger, thereby dehumidify the blown air at the time of heating the interior of the passenger compartment.

Still further, the vehicle air conditioning device may include a temperature adjusting part for adjusting a volume of the blown air flowing into the first heat exchanger to thereby adjust a temperature of air blown off into the passenger compartment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
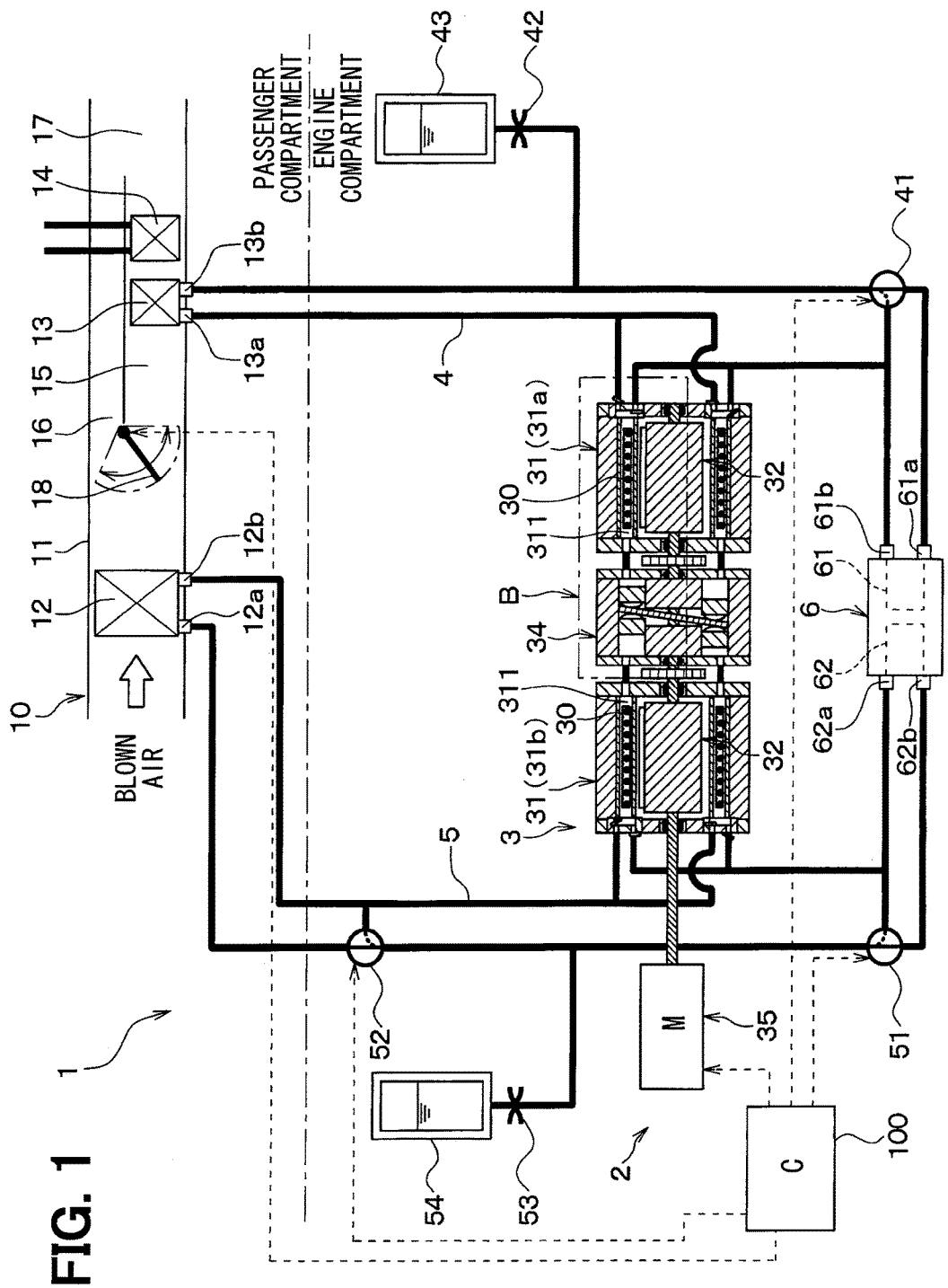
FIG. 1 is a general construction diagram illustrating a vehicle air conditioning device according to a first embodiment.

Example embodiments will now be described more fully with reference to the accompanying drawings.

Hereinafter, embodiments of the present disclosure will be described on the basis of the drawings. In the respective embodiments to be described below, parts identical or equivalent to each other are denoted by the same reference symbols in the drawings.

First Embodiment

A first embodiment of the present disclosure will be described on the basis of FIG. 1 to FIG. 7. FIG. 1 is a general construction diagram of a vehicle air conditioning device 1 of the present embodiment. In the present embodiment, a magnetic refrigeration system 2 of the present disclosure is applied to the vehicle air conditioning device 1 for air-conditioning an interior of a passenger compartment of an automobile.

The vehicle air conditioning device 1 of the present embodiment is an air conditioning device mounted in the automobile acquiring a drive force for driving from an internal combustion engine (engine).

The vehicle air conditioning device 1, as shown in FIG. 1, is provided with the magnetic refrigeration system 2 arranged in an engine compartment, an indoor air conditioning unit 10 arranged in the passenger compartment, and an air conditioning control device 100.

The magnetic refrigeration system 2 of the present embodiment is constructed in such a way as to be capable of switching a refrigerant circuit of a cooling mode for cooling the interior of the passenger compartment, a heating mode for heating the interior of the passenger compartment, and a dehumidifying mode for humidifying the interior of the passenger compartment at the heating time. Hence, the vehicle air conditioning device 1 can cool, heat, and dehumidify the interior of the passenger compartment.

Specifically, the magnetic refrigeration system 2 of the present embodiment employs an AMR (Active Magnetic Refrigeration) system of storing cold heat and hot heat generated by a magnetocaloric effect in a magnetic working material 30 itself. The magnetic refrigeration system 2 of the present embodiment is constructed of a magnetic refrigerator 3 for generating the cold heat and the hot heat by the magnetocaloric effect, a high temperature side refrigerant circuit (first refrigerant circulation circuit) 4 for circulating refrigerant whose temperature is increased by the hot heat generated by the magnetic refrigerator 3 in a heating heat exchanger (first heat exchanger) 13, a low temperature side refrigerant circuit (second refrigerant circulation circuit) 5 for circulating the refrigerant whose temperature is decreased by the cold heat generated by the magnetic refrigerator 3 in a cooling heat exchanger (second heat exchanger) 12, and the like.

The magnetic refrigerator 3 is constructed of: a heat exchange container 31 having working chambers 311 formed therein, the working chamber 311 receiving the magnetic working material 30 having the magnetocaloric effect and having refrigerant (for example, water or antifreeze solution) of a heat transporting medium flowing therethrough; a magnetic field applying and removing device 32 for applying and removing a magnetic field to and from the magnetic working material 30; a refrigerant pump 34 for transferring the refrigerant in the heat exchange container 31; an electric motor 35 corresponding to a drive source of the magnetic refrigerator 3; and the like.

Figure 2:
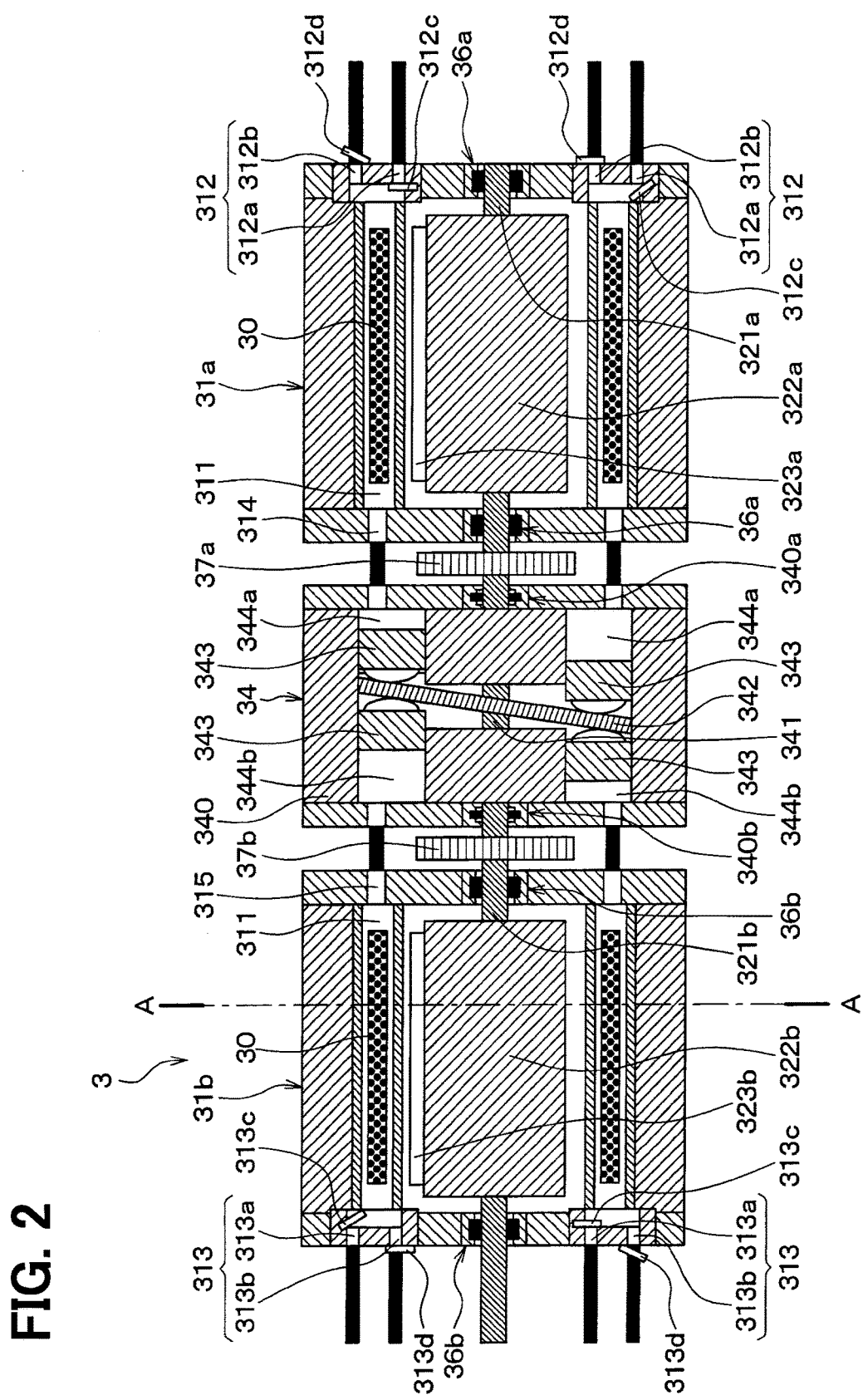
FIG. 2 is an enlarged view illustrating a magnetic refrigerator according to the first embodiment.
Figure 3:
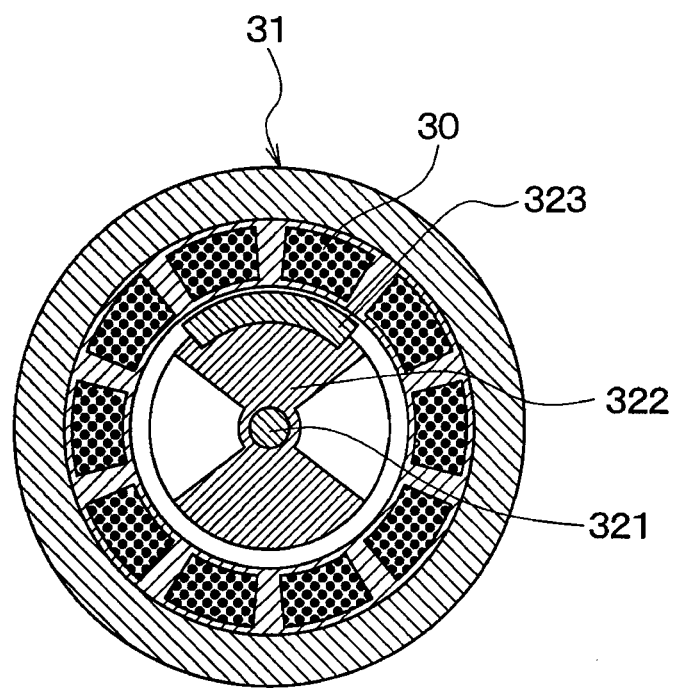
FIG. 3 is a section view taken along a line A-A in FIG. 2.

FIG. 2 is an enlarged view of the magnetic refrigerator 3, and FIG. 3 is a section view taken on a line A-A in FIG. 2. For the sake of convenience of description, in FIG. 2, a section in an axial direction of the magnetic refrigerator 3 is shown.

As shown in FIG. 2, the heat exchange container 31 of the present embodiment is divided into a high temperature side container 31a for generating the hot heat by the magnetocaloric effect and a low temperature side container 31b for generating the cold heat by the magnetocaloric effect. The high temperature side container 31a and the low temperature side container 31b are arranged side by side in a coaxial direction with the refrigerant pump 34 interposed between them.

Each of the high temperature side container 31a and the low temperature side container 31b is constructed of a cylindrical container. Each of the containers 31a, 31b has the working chambers 311 formed therein, the working chamber 311 receiving the magnetic working material 30 in a wall portion constructing an outer shape and having the refrigerant flowing therethrough. Here, as shown in FIG. 3, each of the containers 31a, 31b has a plurality of working chambers 311 formed therein radially in a circumferential direction.

Further, high temperature side and low temperature side refrigerant ports 312, 313 are respectively formed in end faces of the heat exchange container 31 (on sides opposite to the refrigerant pump 34 in the respective containers 31a, 31b), and the refrigerant can be sucked and discharged through the refrigerant ports 312, 313.

Still further, end faces adjacent to the refrigerant pump 34 in the respective containers 31a, 31b have communication passages 314, 315 respectively formed therein, the communication passages 314, 315 communicating with the interior of the cylinder bore 344 of the refrigerant pump 34 which will be described later. In this regard, the communication passages 314, 315 are formed plurally in correspondence to the respective high temperature side ports 312 and to the respective low temperature side ports 313.

Of the refrigerant ports 312, 313, the high temperature side ports 312 formed in the high temperature side container 31a are formed in correspondence to the respective working chambers 311 of the high temperature side container 31a and communicate with the corresponding working chambers 311.

Each of the high temperature side ports 312 is constructed of a refrigerant suction part 312a for sucking the refrigerant and a refrigerant discharge part 312b for discharging the refrigerant. The refrigerant suction part 312a is provided with a suction valve 312c opened at the time of sucking the refrigerant, and the refrigerant discharge part 312b is provided with a discharge valve 312d opened at the time of discharging the refrigerant. Each of the suction valve 312c and the discharge valve 312d of the present embodiment is a reed valve constructed of an elastic plate member having one end fixed.

Still further, of the refrigerant ports 312, 313, the low temperature side ports 313 formed in the low temperature side container 31b are formed in correspondence to the respective working chambers 311 of the low temperature side container 31b and communicate with the corresponding working chambers 311.

As is the case with the high temperature side ports 312, each of the low temperature side ports 313 is constructed of a refrigerant suction part 313a and a refrigerant discharge part 313b. The refrigerant suction part 313a is provided with a suction valve 313c and the refrigerant discharge part 313b is provided with a discharge valve 313d.

Still further, end faces adjacent to the refrigerant pump 34 in the respective containers 31a, 31b have communication passages 314, 315 respectively formed therein, the communication passages 314, 315 communicating with the interior of the cylinder bore 344 of the refrigerant pump 34 which will be described later. In this regard, the communication passages 314, 315 are formed plurally in correspondence to the respective high temperature side ports 312 and to the respective low temperature side ports 313.

In the respective containers 31a, 31b are received rotary shafts 321a, 321b, rotors (rotors) 322a, 322b fixed respectively to the rotary shafts 321a, 321b, and permanent magnets 323a, 323b embedded respectively in the outer circumferential faces of the rotors 322a, 322b, which construct parts of the magnetic field applying and removing device 32.

Each of the rotary shafts 321a, 321b is rotatably supported by support members 36a, 36b disposed on both end portions in a longitudinal direction of each of the containers 31a, 31b.

The high temperature side rotary shaft 321a received in the high temperature side container 31a has an end portion, adjacent to the refrigerant pump 34, extended to the outside of the high temperature side container 31a and coupled to a drive shaft 341 of the refrigerant pump 34, which will be described later, via a speed change mechanism 37a which will be described later.

Further, the low temperature side rotary shaft 321b received in the low temperature side container 31b has an end portion, on the refrigerant pump 34, extended to the outside of the low temperature side container 31b and coupled to the drive shaft 341 of the refrigerant pump 34, which will be described later, via a speed change mechanism 37b which will be described later. Still further, the low temperature side rotary shaft 321b has an end portion on the side opposite to the refrigerant pump 34 extended to the outside of the low temperature side container 31b and coupled to the electric motor 35 for rotating the respective rotary shafts 321a, 321b. The electric motor 35 will be described later.

The rotor 322a, 322b is fixed to the rotary shaft 321a, 321b in such a way as to rotate with a given air gap from the inner circumferential face of the container 31a, 31b in a state where the rotor 322a, 322b has the permanent magnet 323a, 323b disposed on its outer circumferential face.

Still further, as shown in FIG. 3, the permanent magnet 323a, 323b is disposed on the outer circumferential face (for example, a range of about ¼ of the outer circumferential faces) in the rotor 322a, 322b in such a way as to periodically come near to the upper working chambers 311 and the lower working chambers 311 in the container 31a, 31b according to the rotation of the rotary shaft 321a, 321b.

In this way, according to the rotation of the rotary shaft 321a, 321b, a magnetic field generated around the permanent magnet 323a, 323b is applied to the magnetic working material 30 received on the side near to the permanent magnet 323a, 323b in the container 31a, 31b and is removed from the magnetic working material 30 disposed on the side far from the permanent magnet 323a, 323b in the container 31a, 31b.

The refrigerant pump 34 constructs a refrigerant transfer part for transferring the refrigerant between the high temperature side ports 312 and the low temperature side ports 313 which are formed in the heat exchanger container 31. In the present embodiment, a piston pump of a tandem type in which two compression mechanisms are coaxially activated by one drive shaft 341 is employed as the refrigerant pump 34.

Specifically, the refrigerant pump 34 of the present embodiment, as shown in FIG. 2, is constructed of: a housing 340; the drive shaft 341 rotatably supported in the housing 340; a swash plate 342 having a slant face slanted with respect to the drive shaft 341 and rotated integrally with the drive shaft 341; a piston 343 reciprocated according to the rotation of the swash plate 342; the cylinder bore 344 formed on both sides of the piston 343 in the housing 340; and the like.

The drive shaft 341 is rotatably supported by support members 340a, 340b disposed on both end portions in the longitudinal direction of the housing 340. The drive shaft 341 has both end portions thereof extended to the outside of the housing 340 and coupled to the high temperature side rotary shaft 321a and the low temperature side rotary shaft 321b via the respective speed change mechanisms 37a, 37b.

Here, the respective speed change mechanisms 37a, 37b construct a power transmission mechanism for transmitting power generated by the electric motor 35 to the refrigerant pump 34 via the low temperature side rotary shaft 321b coupled to the electric motor 35. Each of the speed change mechanisms 37a, 37b of the present embodiment is constructed in such a way as to adjust the ratio (speed reducing ratio) of the number of revolutions of each of the rotary shafts 321a, 321b to the number of revolutions of the drive shaft 341 of the refrigerant pump 34. The speed reducing ratio is determined according to the number of poles of each of the permanent magnets 323a, 323b fixed respectively to the rotary shafts 321a, 321b. For example, in the case where the number of poles of each of the permanent magnets 323a, 323b is n poles, the speed reducing ratio can be determined to be 1/n in such a way that when the drive shaft 341 of the refrigerant pump 34 is rotated by n, each of the rotary shafts 321a, 321b are rotated by one.

The cylinder bore 344 is constructed of a high temperature side bore part 344a corresponding to the respective communication passages 314 of the high temperature side container 31a and a low temperature side bore part 344b corresponding to the respective communication passages 315 of the low temperature side container 31b. Here, the cylinder bore 344 is constructed in such a way that the refrigerant in the high temperature side bore part 344a can exchange heat with the refrigerant in the low temperature side bore part 344b.

Here, the refrigerant pump 34 of the present embodiment is constructed in such a way as to suck or discharge the refrigerant from or into the respective containers 31a, 31b in synchronization with applying and removing the magnetic field to and from the magnetic working material 30.

For example, the refrigerant pump 34 is constructed in the following way: when the magnetic field is applied to the magnetic working material 30 in the respective working chambers 311 disposed on the upper side of each of the containers 31a, 31b, the refrigerant pump 34 discharges the refrigerant in sequence into the respective working chambers 311 disposed on the upper side in the high temperature side container 31a and sucks the refrigerant in sequence from the respective working chambers 311 disposed on the upper side in the low temperature side container 31b. At this time, by the refrigerant pump 34, the refrigerant is sucked in sequence from the respective working chambers 311 disposed on the lower side in the high temperature side container 31a and is discharged in sequence into the respective working chambers 311 disposed on the lower side in the low temperature side container 31b.

On the other hand, the refrigerant pump 34 is constructed in the following way: when the magnetic field is removed from the magnetic working material 30 in the respective working chambers 311 disposed on the upper side of each of the containers 31a, 31b, the refrigerant pump 34 sucks the refrigerant in sequence from the respective working chambers 311 disposed on the upper side in the high temperature side container 31a and discharges the refrigerant in sequence into the respective working chambers 311 disposed on the upper side in the low temperature side container 31b.

When the refrigerant is discharged into the working chambers 311 of the respective containers 31a, 31b by the refrigerant pump 34, the discharge valves 312d, 313d disposed at the refrigerant discharge parts 312b, 313b of the respective containers 31a, 31b are opened, whereby the refrigerant near the refrigerant discharge parts 312b, 313b in the respective containers 31a, 31b is discharged to the outside.

On the other hand, when the refrigerant is sucked from the working chambers 311 of the respective containers 31a, 31b by the refrigerant pump 34, the suction valves 312c, 313d disposed at the refrigerant suction parts 312a, 313a of the respective containers 31a, 31b are opened, whereby the refrigerant is introduced from the outside into portions near the refrigerant suction parts 312a, 313a in the respective containers 31a, 31b.

In this way, in the magnetic refrigerator 3, the refrigerant can be sucked or discharged in sequence from or into the respective working chambers 311 in the respective containers 31a, 31b in synchronization with applying and removing the magnetic field to and from the magnetic working material 30, so that the refrigerant near the refrigerant discharge parts 312b, 313b in the respective containers 31a, 31b can be continuously discharged to the outside.

Returning to FIG. 1, the electric motor 35 is a drive part that is activated by electric power supplied from a battery (not shown) mounted in the automobile and that supplies power to the rotary shafts 321a, 321b and the drive shaft 341 to thereby drive the magnetic refrigerator 3.

Here, in the present embodiment, the rotary shafts 321a, 321b, the rotors 322a, 322b, the permanent magnets 323a, 323b, which are received respectively in the containers 31, 31b, and the electric motor 35 disposed on the outside of the heat exchange container 31 construct the magnetic field applying and removing device 32 that is a magnetic field applying and removing part. Further, each of the permanent magnets 323a, 323b constructs a magnetic field generating part for generating a magnetic field.

Next, the high temperature side refrigerant circuit 4 and the low temperature side refrigerant circuit 5 will be described. First, describing the high temperature side refrigerant circuit 4, the high temperature side refrigerant circuit 4 is a refrigerant circulation circuit for introducing the refrigerant discharged from the refrigerant discharge parts 312b of the high temperature side ports 312 in the high temperature side container 31a into a refrigerant flow-in port 13a of the heating heat exchanger 13 and for returning the refrigerant flowing out of a refrigerant flow-out port 13b of the heating heat exchanger 13 into the refrigerant suction parts 312a of the high temperature side ports 312.

Specifically, the refrigerant discharge parts 312b of the high temperature side ports 312 have the refrigerant flow-in port 13a of the heating heat exchanger 13 connected thereto. The heating heat exchanger 13 is a heat exchanger (first heat exchanger) that is arranged in a case 11 of the indoor air conditioning unit 10 to be described later and that makes the refrigerant flowing through the case 11 exchange heat with blown air after passing through the cooling heat exchanger 12 to be described later to thereby heat the blown air.

The refrigerant flow-out port 13b of the heating heat exchanger 13 has a first electric three-way valve 41 connected thereto. The first electric three-way valve 41 constructs a flow passage switching part whose activation is controlled by a control signal outputted from the air conditioning control device 100.

More specifically, the first electric three-way valve 41 switches a refrigerant circuit for connecting the refrigerant flow-out port 13b of the heating heat exchanger 13 to the refrigerant suction part 312a of the high temperature side container 31a and a refrigerant flow passage for connecting the refrigerant flow-out port 13b of the heating heat exchanger 13 to a heat radiation side refrigerant flow-in port 61*a* of a heat absorbing and radiating heat exchanger 6.

The heat absorbing and radiating heat exchanger 6 is an outdoor heat exchanger that is arranged in the engine compartment and that makes the refrigerant flowing through itself exchange heat with an outside air. The heat absorbing and radiating heat exchanger 6 of the present embodiment is constructed of two heat exchange parts corresponding to a heat radiating part 61 through which the refrigerant flowing out of the heating heat exchanger 13 flows and a heat absorption part 62 through which the refrigerant discharged from the low temperature side container 31*b* flows.

The heat radiating part 61 of the heat absorbing and radiating heat exchanger 6 is a heat exchange part for making the refrigerant flowing-in (refrigerant flowing out of the heating heat exchanger 13) through the heat radiation side refrigerant flow-in port 61*a* exchange heat with the outside air. Further, the heat absorption part 62 of the heat absorbing and radiating heat exchanger 6 is a heat exchange part for making the refrigerant flowing-in (refrigerant discharged from the low temperature side container 31*b*) through the heat absorption side refrigerant flow-in port 62*a* exchange heat with the outside air.

In this regard, the heat radiating part 61 and the heat absorption part 62 have their refrigerant flow passages constructed independently of each other so as to prevent the refrigerant flowing through the heat radiating part 61 and the refrigerant flowing in the heat absorption part 62 from being mixed with each other in the heat absorbing and radiating heat exchanger 6.

The heat radiation side refrigerant flow-out port 61*b* of the heat absorbing and radiating heat exchanger 6 has the refrigerant suction parts 312*a* of the high temperature side container 31*a* connected thereto, and the refrigerant having heat radiated in the heat absorbing and radiating heat exchanger 6 is returned to the working chambers 311 of the high temperature side container 31*a*.

Thus, the high temperature side refrigerant circuit 4 is constructed of: a circulation circuit in which the refrigerant is circulated in order of the refrigerant discharge part 312*b* of the high temperature side container 31*a*, the heating heat exchanger 13, the first electric three-way valve 41, and the refrigerant suction part 312*a* of the high temperature side container 31*a*; and a circulation circuit in which the refrigerant is circulated in order of the refrigerant discharge part 312*b* of the high temperature side container 31*a*, the heating heat exchanger 13, the first electric three-way valve 41, the heat radiating part 61 of the heat absorbing and radiating heat exchanger 6, and the refrigerant suction part 312*a* of the high temperature side container 31*a*.

In this regard, the high temperature side refrigerant circuit 4 has a reservoir tank 43 connected between the heating heat exchanger 13 and the first electric three-way valve 41 via a fixed throttle 42, the reservoir tank 43 adjusting the amount of the refrigerant flowing through the high temperature side refrigerant circuit 4. As the fixed throttle 42 can be employed an orifice or a capillary tube.

Further, the low temperature side refrigerant circuit 5 is a refrigerant circulation circuit that introduces the refrigerant discharged from the refrigerant discharge parts 313*b* of the low temperature side ports 313 in the low temperature side container 31*b* into the refrigerant flow-in port 12*a* of the cooling heat exchanger 12 and that returns the refrigerant flowing out of the refrigerant flow-out port 12*b* of the cooling heat exchanger 12 to the refrigerant suction parts 313*a* of the low temperature side ports 313.

Specifically, the refrigerant discharge parts 313*b* of the low temperature side ports 313 have a second electric three-way valve 51 connected thereto. As is the case with the first electric three-way valve 41, the second electric three-way valve 51 constructs a flow passage switching part whose activation is controlled by a control signal outputted from the air conditioning control device 100.

The second electric three-way valve 51 switches a refrigerant circuit for connecting the refrigerant discharge parts 313*b* of the low temperature side ports 313 to the heat absorption side refrigerant flow-in port 62*a* of the heat absorbing and radiating heat exchanger 6 and a refrigerant circuit for connecting the refrigerant discharge parts 313*b* of the low temperature side ports 313 to a third electric three-way valve 52 in accordance with a control signal outputted from the air conditioning control device 100. The heat absorption side refrigerant flow-out port 62*b* of the heat absorbing and radiating heat exchanger 6 has the third electric three-way valve 52 connected thereto.

As are the cases with the first and the second electric three-way valves 41, 51, the third electric three-way valve 52 constructs a flow passage switching part whose activation is controlled by a control signal outputted from the air conditioning control device 100.

Specifically, the third electric three-way valve 52 is constructed in such a way as to be activated in conjunction with the second electric three-way valve 51. That is, when the refrigerant circuit is switched by the second electric three-way valve 51 to a refrigerant circuit for connecting the refrigerant discharge parts 313*b* of the low temperature side ports 313 to the third electric three-way valve 52, the third electric three-way valve 52 switches the refrigerant circuit to a refrigerant circuit for connecting the second electric three-way valve 51 to the refrigerant flow-in port 12*a* of the cooling heat exchanger 12. Further, when the refrigerant circuit is switched by the second electric three-way valve 51 to a refrigerant circuit for connecting the refrigerant discharge parts 313*b* of the low temperature side ports 313 to the heat absorption side refrigerant flow-in port 62*a* of the heat absorbing and radiating heat exchanger 6, the third electric three-way valve 52 switches the refrigerant circuit to a refrigerant circuit for connecting the second electric three-way valve 51 to the refrigerant suction parts 313*a* of the low temperature side ports 313.

The cooling heat exchanger 12 connected to the third electric three-way valve 52 is a heat exchanger that is arranged on the upstream of the heating heat exchanger 13 in the flow of the blown air in the case 11 of the indoor air conditioning unit 10 and that makes the refrigerant flowing through itself exchange heat with the blown air to thereby cool the blown air. The refrigerant suction parts 313*a* of the low temperature side ports 313 are connected to the refrigerant flow-out port 12*b* of the cooling heat exchanger 12.

In this way, the low temperature side refrigerant circuit 5 is constructed of: a circulation circuit in which the refrigerant is circulated in order of the refrigerant discharge parts 313*b* of the low temperature side container 31*b*, the second electric three-way valve 51, the third electric three-way valve 52, the cooling heat exchanger 12, and the refrigerant suction parts 313*a* of the low temperature side container 31*b*; and a circulation circuit in which the refrigerant is circulated in order of the refrigerant discharge parts 313*b* of the low temperature side container 31*b*, the heat absorption part 62 of the heat absorbing and radiating heat exchanger 6, the second electric three-way valve 51, the third electric three-way valve 52, and the refrigerant suction parts 313*a* of the low temperature side container 31*b*.

In this regard, the low temperature side refrigerant circuit 5 has a reservoir tank 54 connected between the second electric three-way valve 51 and the heat absorbing and radiating heat exchanger 6, and the third electric three-way valve 52 via a fixed throttle 53, the reservoir tank 54 adjusting the amount of the refrigerant flowing through the low temperature side refrigerant circuit 5. As the fixed throttle 53 can be employed an orifice or a capillary tube.

Next, the indoor air conditioning unit 10 will be described. The indoor air conditioning unit 10 is a unit that is arranged inside a meter board (instrument panel) at a forefront portion in the passenger compartment and that receives a blower (not shown), the cooling heat exchanger 12, the heating heat exchanger 13, and a heater core 14 in the case 11 of forming the outer shape thereof.

The case 11 forms an air flow passage for the blown air to be blown into the passenger compartment and is formed of resin having a certain degree of elasticity and excellent in strength (for example, polypropylene). An inside and outside air switching box (not shown) for switching and introducing an inside air (air inside the passenger compartment) and an outside air (air outside the passenger compartment) is arranged on the most upstream side of the flow of the blown air in the case 11.

More specifically, in the inside and outside air switching box are formed an inside air introduction port through which the inside air is introduced into the case 11 and an outside air introduction port through which the outside air is introduced into the case 11. Further, in the inside and outside air switching box is arranged an inside and outside air switching door for continuously adjusting an opening area of the inside air introduction port and an opening area of the outside air introduction port to thereby change a ratio of the volume of the inside air and the volume of the outside air. The inside and outside air switching door constructs an air volume ratio changing part for switching a suction port mode of changing the ratio of the volume of the inside air and the volume of the outside air which are introduced into the case 11.

On the downstream side of the inside and outside air switching box in the air flow is arranged a blower for blowing the air sucked through the inside and outside air switching box into the passenger compartment. The blower is an electric blower for driving a centrifugal multi-blade fan (sirocco fan) by an electric motor and has the number of revolutions (the volume of blown air) controlled by a control voltage outputted from the air conditioning control device 100.

The cooling heat exchanger 12 is arranged on the downstream side of the blower in the air flow. On the downstream side of the cooling heat exchanger 12 in the air flow are formed air passages such as a heating cold air passage 15 and a cold air bypass passage 16 through which the air after passing through the cooling heat exchanger 12 flows, and an air mixing space 17 in which the air flowing out of the heating cold air passage 15 is mixed with the air flowing out of the cold air bypass passage 16.

In the heating cold air passage 15, the heating heat exchanger 13 and a heater core 14 are arranged in this order in a direction in which the blown air flows as a heating part for heating the air after passing through the cooling heat exchanger 12. The heater core 14 is a heat exchanger for making cooling water of an engine (not shown) which outputs a drive force for running the automobile exchange heat with the air after passing through the cooling heat exchanger 12 to thereby heat the air after passing through the cooling heat exchanger 12.

On the other hand, the cold air bypass passage 16 is an air passage for introducing the air after passing through the cooling heat exchanger 12 into the air mixing space 17 without passing through the heating heat exchanger 13 and the heater core 14. Hence, the temperature of the blown air mixed in the air mixing space 17 is changed according to the ratio of the volume of the air passing through the heating heat exchanger 15 and the volume of the air passing through the cold air bypass passage 16.

Thus, in the present embodiment, an air mixing door 18 for continuously changing the ratio of the volume of the air flowing into the heating cold air passage 15 and the volume of the air flowing into the cold air bypass passage 16 is disposed on the downstream side of the cooling heat exchanger 12 in the air flow and on the entry side of the heating cold air passage 15 and the cold air bypass passage 16. In other words, the air mixing door 18 constructs a temperature adjusting part for adjusting the volume of the blown air flowing into the heating heat exchanger 13 to thereby adjust an air temperature in the air mixing space 17 (temperature of the air blown off into the passenger compartment).

Further, on the most downstream side in the flow of the blown air in the case 11 are arranged blowoff ports (not shown, for example, face blowoff port, foot blowoff port, and defroster blowoff port) for blowing off the blown air having temperature adjusted into the passenger compartment, which is a space to be cooled, from the air mixing space 17. In this regard, on the upstream side of each of the blowoff ports in the air flow is arranged a door for adjusting an opening area of the blowoff port, and the blowoff ports for blowing off the conditioned air into the passenger compartment can be switched by opening or closing the respective doors.

Next, an electric control part of the present embodiment will be described. The air conditioning control device 100 is constructed of a well known microcomputer, which includes a CPU, a ROM, and a RAM, and a peripheral circuit thereof. The air conditioning control device 100 performs various operations and processings on the basis of control programs stored in the ROM to thereby control the activations of the electric motor 35, the respective electric three-way valves 41, 51, 52 for constructing flow passage switching parts, the blower, and the drive part of the air mixing door 18 connected to the output side.

An operation signal is inputted to the input side of the air conditioning control device 100 from various air conditioning operation switches disposed in an operation panel (not shown) arranged near the instrument panel in the front portion of the passenger compartment. Specifically, the various air conditioning operation switches disposed in the operation panel include an activating switch, an automatic switch, and a selector switch of an operation mode (cooling mode, heating mode, dehumidifying mode) of the vehicle air conditioning device 1.

In this regard, the air conditioning control device 100 has an electric motor control part controlling the electric motor 35 corresponding to the drive part of the magnetic refrigerator 3 and a flow passage switching control part controlling the respective electric three-way valves 41, 51, 52.

Next, the operation of the vehicle air conditioning device 1 including the magnetic refrigeration system 2 of the present embodiment in the construction described above will be described. First, an operation principle of the magnetic refrigerator 3 in the magnetic refrigeration system 2 will be generally described on the basis of FIG. 4.

Figure 4:
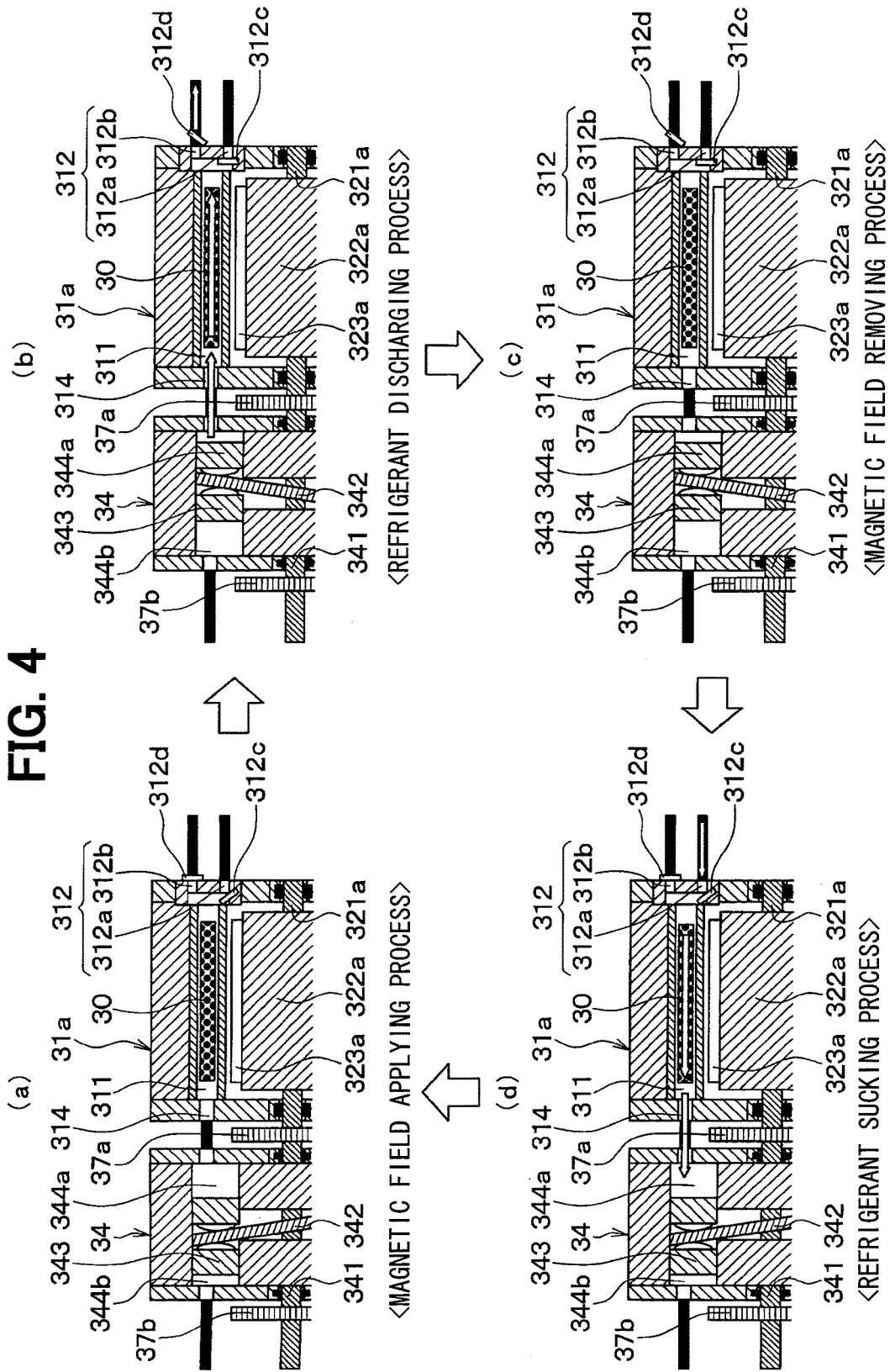
FIG. 4 is an explanatory view illustrating an operating principle of the magnetic refrigerator according to the first embodiment.

FIG. 4 illustrates enlarged views of a portion B shown in FIG. 1. Here, (a) of FIG. 4 shows a magnetic field applying process of applying a magnetic field to the magnetic working material 30, (b) of FIG. 4 shows a refrigerant discharging process of discharging the refrigerant from the working chamber 311, (c) of FIG. 4 shows a magnetic field removing process of removing the magnetic field from the magnetic working material 30, and (d) of FIG. 4 shows a refrigerant sucking process of sucking the refrigerant into the working chamber 311.

As shown in (a) of FIG. 4, when the piston 343 in the high temperature side bore part 344a in the refrigerant pump 34 is positioned near a bottom dead center and the permanent magnet 323a comes near to the upper working chambers 311 of the high temperature side container 31a, a magnetic field is applied to the magnetic working material 30 received in the upper working chambers 311 (that is, the magnetic working material 30 is magnetized, the magnetic field applying process). At this time, the magnetic working material 30 generates heat by the magnetocaloric effect, whereby the refrigerant in the upper working chambers 311 is increased in temperature.

Then, as shown in (b) of FIG. 4, the piston 343 in the high temperature side bore part 344a is moved from the bottom dead center to a top dead center and the refrigerant in the upper working chambers 311 is transferred from the refrigerant pump 34 to the high temperature side ports 312. At this time, the discharge valves 312d disposed at the refrigerant discharge parts 312b of the high temperature side ports 312 are opened and hence the high temperature refrigerant near the refrigerant discharge parts 312b is discharged to the heating heat exchanger 13 (refrigerant discharging process).

Then, as shown in (c) of FIG. 4, when the piston 343 in the high temperature side bore part 344a is positioned near the top dead center and the permanent magnet 323a is moved away from the upper working chambers 311 of the high temperature side container 31a, the magnetic field is removed from the magnetic working material 30 received in the upper working chambers 311 (that is, the magnetic working material 30 is demagnetized, magnetic field removing process).

Then, as shown in (d) of FIG. 4, the piston 343 in the high temperature side bore part 344a is moved from the top dead center to the bottom dead center and the refrigerant in the upper working chambers 311 is transferred from the high temperature side ports 312 to the refrigerant pump 34. At this time, the suction valves 312c disposed at the refrigerant suction parts 312a of the high temperature side ports 312 are opened and the refrigerant flowing out of the heating heat exchanger 13 is sucked into portions near the refrigerant suction parts 312a (refrigerant sucking process). Then, when the piston 343 of the refrigerant pump 34 is returned near the bottom dead center, there is brought about the magnetic field applying process shown in (a) of FIG. 4.

In this way, the hot heat generated by the magnetocaloric effect of the magnetic working material 30 received in the upper working chambers 311 of the high temperature side container 31a can be transported to the heating heat exchanger 13 by these four processes of the magnetic field applying process, the refrigerant discharging process, the magnetic field removing process, and the refrigerant sucking process.

Here, on the lower working chambers 311 of the high temperature side container 31a, as is the case with the upper working chambers 311, the four processes of the magnetic field applying process, the refrigerant discharging process, the magnetic field removing process, and the refrigerant sucking process are performed, which is different only in timing from the processes performed on the upper working chambers 311.

Here, although not shown, on the upper working chambers 311 of the low temperature side container 31b, at the time of the magnetic field applying process on the upper working chambers 311 of the high temperature side container 31a, the magnetic field is applied to the magnetic working material 30 in a state where the piston 343 in the low temperature side bore part 344b is positioned near the top dead center.

Then, the piston 343 in the low temperature side bore part 344b is moved from the top dead center to the bottom dead center and the refrigerant in the upper working chambers 311 is transferred from the low temperature side ports 313 to the refrigerant pump 34. At this time, the suction valves 313c disposed at the refrigerant suction parts 313a of the low temperature side ports 313 are opened and the refrigerant flowing out of the cooling heat exchanger 12 is sucked into portions near the refrigerant suction parts 313a (refrigerant sucking process).

Then, on the upper working chambers 311 of the low temperature side container 31b, at the time of the magnetic field removing process on the upper working chambers 311 of the high temperature side container 31a, the magnetic field is removed from the magnetic working material 30 received in the upper working chambers 311 in a state where the piston 343 in the low temperature side bore part 344b is positioned near the bottom dead center.

Then, the piston 343 in the low temperature side bore part 344b is moved from the bottom dead center to the top dead center and the refrigerant in the upper working chambers 311 is transferred from the refrigerant pump 34 to the low temperature side ports 313. At this time, the discharge valves 313d disposed at the refrigerant discharge parts 313b of the low temperature side ports 313 are opened and the refrigerant near the refrigerant discharge parts 312b is discharged to the cooling heat exchanger 12 side (refrigerant discharging process).

In this way, the cold heat generated by the magnetocaloric effect of the magnetic working material 30 received in the upper working chambers 311 of the low temperature side container 31b can be transported to the cooling heat exchanger 12 by these four processes of the magnetic field applying process, the refrigerant discharging process, the magnetic field removing process, and the refrigerant sucking process.

In this regard, on the lower working chambers 311 of the low temperature side container 31b, as is the case with the upper working chambers 311, the four processes of the magnetic field applying process, the refrigerant discharging process, the magnetic field removing process, and the refrigerant sucking process are performed, which is different only in timing from the processes performed on the upper working chambers 311.

Here, when the heat exchange container 31 is viewed on the whole, after the magnetic field is applied to the magnetic working material 30, the refrigerant is transferred from the low temperature side ports 313 to the high temperature side ports 312, whereas after the magnetic field is removed from the magnetic working material 30, the refrigerant is transferred from the high temperature side ports 312 to the low temperature side ports 313.

Then, the magnetic field applying process, the refrigerant discharging process, the magnetic field removing process, and the refrigerant sucking process are repeated on the high temperature side container 31a in the heat exchange container 31, and the magnetic field applying process, the refrigerant discharging process, the magnetic field removing process, and the refrigerant sucking process are repeated on the low temperature side container 31b, whereby a large temperature gradient can be generated between the magnetic working material 30 received in the upper working chambers 311 of the high temperature side container 31a and the magnetic working material 30 received in the upper working chambers 311 of the low temperature side container 31b.

Figure 6:
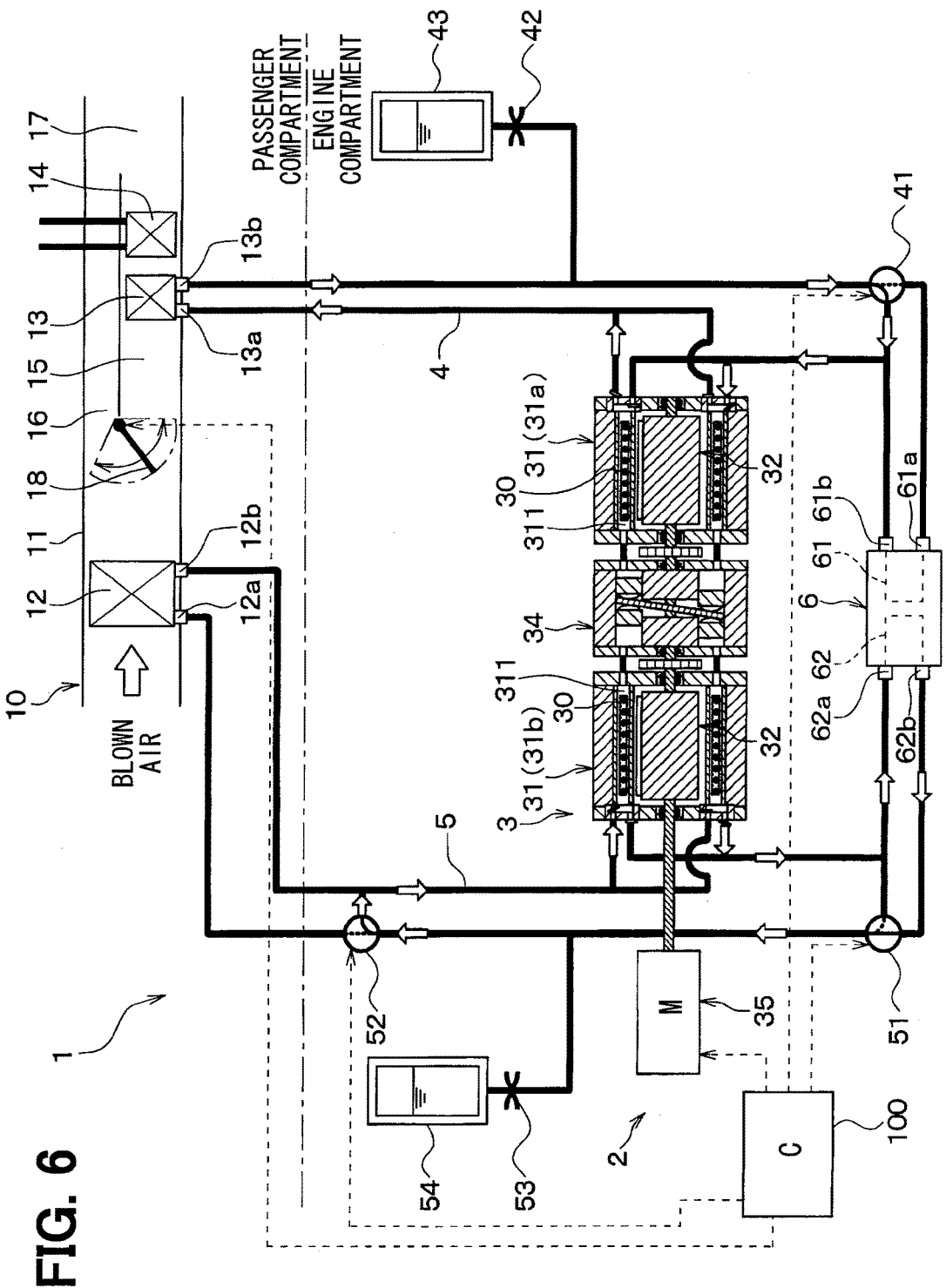
FIG. 6 is a general construction diagram illustrating the refrigerant circuit at the time of a heating mode of the vehicle air conditioning device according to the first embodiment.
Figure 7:
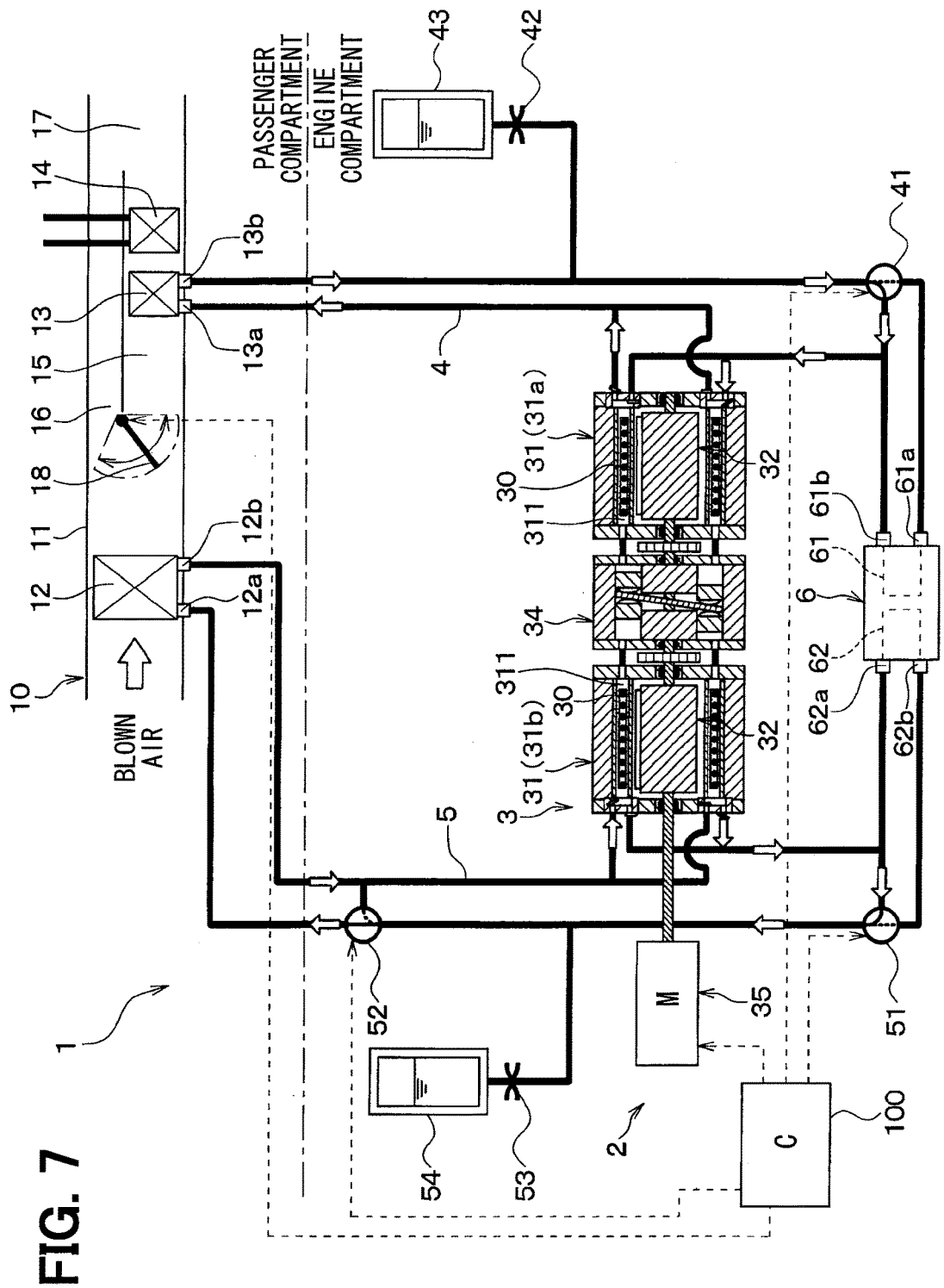
FIG. 7 is a general construction diagram illustrating the refrigerant circuit at the time of a dehumidifying mode of the vehicle air conditioning device according to the first embodiment.

Next, an action at the time of each operation mode of the vehicle air conditioning device 1 will be described on the basis of FIG. 5 to FIG. 7. Each operation mode is set as appropriate by a selector switch of the operation mode disposed in the operation panel or by a control processing of the air conditioning control device 100. Here, FIG. 5 shows the refrigerant circuit at the time of the cooling mode, FIG. 6 shows the refrigerant circuit at the time of the heating mode, and FIG. 7 shows the refrigerant circuit at the time of the dehumidifying mode.

Figure 5:
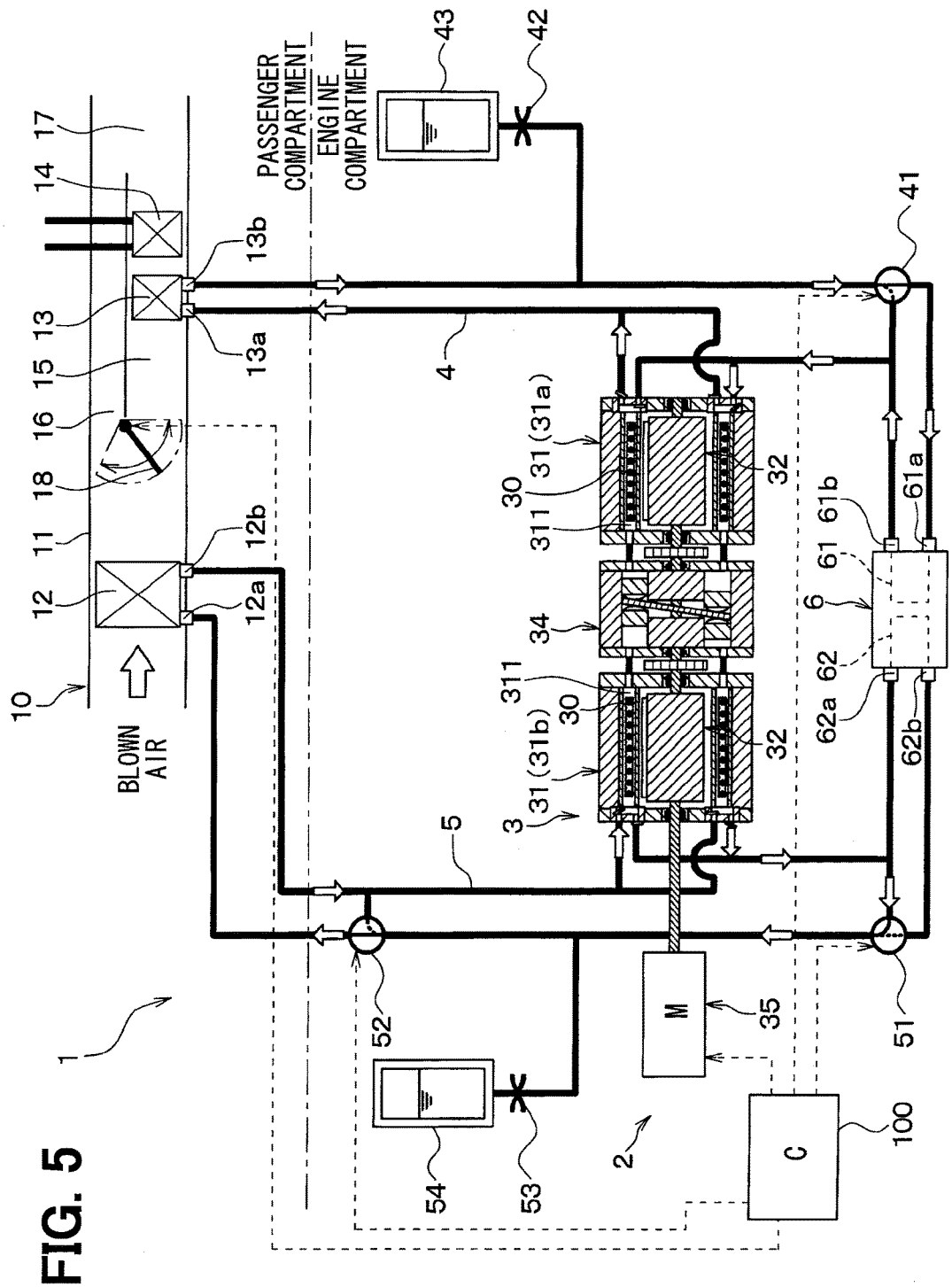
FIG. 5 is a general construction diagram illustrating a refrigerant circuit at the time of a cooling mode of the vehicle air conditioning device according to the first embodiment.

(A) Cooling Mode (See FIG. 5)

In the cooling mode, the high temperature side refrigerant circuit 4 is switched to the refrigerant circuit for connecting the refrigerant flow-out port 13b of the heating heat exchanger 13 to the heat radiation side refrigerant flow-in port 61a of the heat absorbing and radiating heat exchanger 6 by the first electric three-way valve 41 according to a control signal from the air conditioning control device 100. Further, the low temperature side refrigerant circuit 5 is switched by the second electric three-way valve 51 to the refrigerant circuit for connecting the refrigerant discharge parts 313b of the low temperature side ports 313 to the third electric three-way valve 52 and is switched by the third electric three-way valve 52 to the refrigerant circuit for connecting the second electric three-way valve 51 to the refrigerant flow-in port 12a of the cooling heat exchanger 12.

In this way, as shown by arrows in FIG. 5, in the high temperature side refrigerant circuit 4 is constructed a circulation circuit in which the refrigerant is circulated in order of the magnetic refrigerator 3, the heating heat exchanger 13, the first electric three-way valve 41, the heat radiating part 61 of the heat absorbing and radiating heat exchanger 6, and the magnetic refrigerator 3. Further, in the low temperature side refrigerant circuit 5 is constructed a circulation circuit in which the refrigerant is circulated in order of the magnetic refrigerator 3, the second electric three-way valve 51, the third electric three-way valve 52, the cooling heat exchanger 12, and the magnetic refrigerator 3.

Thus, the refrigerant having temperature increased by the magnetic refrigerator 3 is discharged from the refrigerant discharge parts 312b of the high temperature side container 31a of the magnetic refrigerator 3 to the heating heat exchanger 13 and exchanges heat with the blown air (cold air) after passing through the cooling heat exchanger 12 in the heating heat exchanger 13, thereby being cooled. The refrigerant flowing out of the heating heat exchanger 13 exchanges heat with the outside air in the heat radiating part 61 of the heat absorbing and radiating heat exchanger 6, thereby being cooled. Then, the refrigerant is sucked into the high temperature side container 31a via the refrigerant suction parts 312a of the magnetic refrigerator 3, thereby being again increased in temperature.

On the other hand, the refrigerant having temperature decreased by the magnetic refrigerator 3 is discharged from the low temperature side ports 313 of the low temperature side container 31b of the magnetic refrigerator 3 to the cooling heat exchanger 12 and absorbs heat from the blown air in the cooling heat exchanger 12. In this way, the blown air passing through the cooling heat exchanger 12 is cooled.

At this time, the opening of the air mixing door 18 in the case 11 is adjusted, whereby a portion (or all) of the blown air cooled by the cooling heat exchanger 12 flows into the cold air bypass passage 16 and then flows into the air mixing space 17, whereas a portion (or all) of the blown air cooled by the cooling heat exchanger 12 flows into the heating cold air passage 15 and is again heated at the time of passing through the heating heat exchanger 13 and the heater core 14 and then flows into the air mixing space 17.

In this way, both portions of the blown air are mixed in the air mixing space 17 and hence the temperature of the blown air to be blown off into the passenger compartment is adjusted to a desired temperature, whereby the interior of the passenger compartment can be cooled. In the cooling mode, the blown air has also a high dehumidifying capacity but hardly exerts a heating capacity.

Here, the refrigerant flowing out of the cooling heat exchanger 12 is sucked into the low temperature side container 31b via the refrigerant suction parts 313a of the magnetic refrigerator 3, thereby being again decreased in temperature.

(B) Heating Mode (See FIG. 6)

In the heating mode, the high temperature side refrigerant circuit 4 is switched to the refrigerant circuit for connecting the refrigerant flow-out port 13b of the heating heat exchanger 13 to the refrigerant suction parts 312a of the high temperature side container 31a by the first electric three-way valve 41 according to a control signal from the air conditioning control device 100. Further, the low temperature side refrigerant circuit 5 is switched to the refrigerant circuit for connecting the refrigerant discharge parts 313b of the low temperature side ports 313 to the heat absorption side refrigerant flow-in port 62a of the heat absorbing and radiating heat exchanger 6 by the second electric three-way valve 51 and is switched to the refrigerant circuit for connecting the second electric three-way valve 51 to the refrigerant suction parts 313a of the low temperature side ports 313 by the third electric three-way valve 52.

In this way, as shown by arrows in FIG. 6, in the high temperature side refrigerant circuit 4 is constructed a circulation circuit in which the refrigerant is circulated in order of the magnetic refrigerator 3, the heating heat exchanger 13, the first electric three-way valve 41, and the magnetic refrigerator 3. Further, in the low temperature side refrigerant circuit 5 is constructed a circulation circuit in which the refrigerant is circulated in order of the magnetic refrigerator 3, the heat absorption part 62 of the heat absorbing and radiating heat exchanger 6, the second electric three-way valve 51, the third electric three-way valve 52, and the magnetic refrigerator 3.

Thus, the refrigerant having temperature increased by the magnetic refrigerator 3 is discharged from the refrigerant discharge parts 312b of the high temperature side container 31a of the magnetic refrigerator 3 to the heating heat exchanger 13 and exchanges heat with the blown air blown from the blower in the heating heat exchanger 13, thereby being cooled. In this way, the blown air passing through the heating heat exchanger 13 is heated.

At this time, since the opening of the air mixing door 18 is adjusted, as is the case with the cooling mode, both portions of the blown air are mixed in the air mixing space 17 and the temperature of the blown air blown off into the passenger compartment can be adjusted to a desired temperature and the interior of the passenger compartment can be heated. Here, in the heating mode, the dehumidifying capacity of the blown air is not exerted.

The refrigerant flowing out of the heating heat exchanger 13 is sucked into the high temperature side container 31a via the refrigerant suction parts 312a of the magnetic refrigerator 3, thereby being again increased in temperature.

On the other hand, the refrigerant having temperature decreased by the magnetic refrigerator 3 is discharged from the low temperature side ports 313 of the low temperature side container 31b of the magnetic refrigerator 3 to the heat absorbing and radiating heat exchanger 6 and exchanges heat with the outside air in the heat absorption part 62 of the heat absorbing and radiating heat exchanger 6, thereby being increased in temperature. The refrigerant flowing out of the heat absorption part 62 of the heat absorbing and radiating heat exchanger 6 is sucked into the low temperature side container 31b via the refrigerant suction parts 313a of the magnetic refrigerator 3, thereby being again decreased in temperature.

(C) Dehumidifying Mode (See FIG. 7)

In the dehumidifying mode, the high temperature side refrigerant circuit 4 is switched to the refrigerant circuit for connecting the refrigerant flow-out port 13b of the heating heat exchanger 13 to the refrigerant suction parts 312a of the high temperature side container 31a by the first electric three-way valve 41 according to a control signal from the air conditioning control device 100. Further, the low temperature side refrigerant circuit 5 is switched to the refrigerant circuit for connecting the refrigerant discharge parts 313b of the low temperature side ports 313 to the third electric three-way valve 52 by the second electric three-way valve 51 and is switched to the refrigerant circuit for connecting the second electric three-way valve 51 to the refrigerant flow-in port 12a of the cooling heat exchanger 12 by the third electric three-way valve 52.

In this way, as shown by arrows in FIG. 7, in the high temperature side refrigerant circuit 4 is constructed a circulation circuit in which the refrigerant is circulated in order of the magnetic refrigerator 3, the heating heat exchanger 13, the first electric three-way valve 41, and the magnetic refrigerator 3. Further, in the low temperature side refrigerant circuit 5 is constructed a circulation circuit in which the refrigerant is circulated in order of the magnetic refrigerator 3, the second electric three-way valve 51, the third electric three-way valve 52, the cooling heat exchanger 12, and the magnetic refrigerator 3.

Thus, the refrigerant having temperature increased by the magnetic refrigerator 3 is discharged from the refrigerant discharge parts 312b of the high temperature side container 31a of the magnetic refrigerator 3 to the heating heat exchanger 13 and exchanges heat with the blown air (cold air) after passing through the cooling heat exchanger 12 in the heating heat exchanger 13, thereby being cooled. In this way, the blown air passing through the heating heat exchanger 13 is heated.

On the other hand, the refrigerant having temperature decreased by the magnetic refrigerator 3 is discharged from the low temperature side ports 313 of the low temperature side container 31b of the magnetic refrigerator 3 to the cooling heat exchanger 12 and absorbs heat from the blown air in the cooling heat exchanger 12. In this way, the blown air passing through the cooling heat exchanger 12 is cooled and dehumidified.

In this way, the blown air cooled and dehumidified by the cooling heat exchanger 12 is again heated at the time of passing through the heating heat exchanger 13 and the heater core 14 and is blown off into the passenger compartment from the air mixing space 17. In other words, the interior of the passenger compartment can be dehumidified. Here, in the dehumidifying mode, the humidifying capacity of the blown air can be exerted but the heating capacity is reduced as compared with the heating mode.

The refrigerant flowing out of the heating heat exchanger 13 is sucked into the high temperature side container 31a via the refrigerant suction parts 312a of the magnetic refrigerator 3, thereby being again increased in temperature.

The vehicle air conditioning device 1 including the magnetic refrigeration system 2 of the present embodiment is activated in the manner described above and hence can produce the following excellent advantages.

As described above, in the working chambers 311 of the heat exchange container 31 in the magnetic refrigerator 3, the magnetic field is applied to the magnetic working material 30 and then the refrigerant is transferred from the low temperature side ports 313 to the high temperature side ports 312, whereby the refrigerant near the high temperature side ports 312, whose temperature is increased by the hot heat of the magnetic working material 30 caused by applying the magnetic field, can be made to flow into the heating heat exchanger 13 via the high temperature side refrigerant circuit 4.

Further, in the working chambers 311 of the heat exchange container 31 in the magnetic refrigerator 3, the magnetic field is removed from the magnetic working material 30 and then the refrigerant is transferred from the high temperature side ports 312 to the low temperature side ports 313, whereby the refrigerant near the low temperature side ports 313, whose temperature is decreased by the cold heat of the magnetic working material 30 caused by removing the magnetic field, can be made to flow into the cooling heat exchanger 12 via the low temperature side refrigerant circuit 5.

In this way, the refrigerant having temperature increased by the hot heat generated in the magnetic working material 30 can be made to directly flow into the heating heat exchanger 13 and the refrigerant having temperature decreased by the cold heat generated in the magnetic working material 30 can be made to directly flow into the cooling heat exchanger 12. As a result, a heat exchange loss can be reduced when the hot heat and the cold heat generated in the magnetic working material 30 are transported to the respective heat exchangers 12, 13.

For example, a temperature of refrigerant at the high temperature side ports 312 of the heat exchange container 31 in the magnetic refrigerator 3 is defined as Th, and a temperature of refrigerant at the low temperature side ports 313 is defined as Tl (<Th). Further, a cycle efficiency η of the magnetic refrigeration system 2 is defined as 80% of a cycle efficiency ηth of an ideal Carnot cycle. At this time, in a construction in which the hot heat and the cold heat of the refrigerant in the heat exchange container 31 are transported directly to the heating heat exchanger 13 and the cooling heat exchanger 12, as in the present embodiment, COP can be expressed by the following mathematical formula F1.

$$COP = \{Th/(Th-Tl)\} \times 80/100 \tag{F1}$$

On the other hand, in a construction in which the hot heat and the cold heat of the refrigerant in the heat exchange container 31 are transported indirectly to the heating heat exchanger 13 and the cooling heat exchanger 12, as in the prior art, temperatures on the heating heat exchanger 13 and the cooling heat exchanger 12 become temperatures (Th−

ΔT, Tl−ΔT) acquired by subtracting a heat exchange loss ΔT from Th, Tl, then COP can be expressed by the following mathematical formula F2.

$$COP=\{(Th-\Delta T)/(Th-Tl)\}\times 80/100 \quad (F2)$$

In this way, in the magnetic refrigeration system 2 of the present embodiment, the heat exchange loss ΔT can be reduced when the hot heat and the cold heat generated in the magnetic working material 30 are transported to the respective heat exchangers 12, 13. Hence, as compared with the magnetic refrigeration system of the prior art, the COP of the magnetic refrigeration system 2 can be improved.

The magnetic refrigerator 3 employing the AMR system has a construction in which the refrigerant in the working chambers 311 of the heat exchange container 31 is transferred between the high temperature side ports 312 and the low temperature side ports 313. For this reason, if it is employed a construction in which the ports 312, 313 of the heat exchange container 31 are connected to the corresponding heat exchanger 12, 13 simply by the use of piping or the like, the refrigerant discharged from the respective ports 312, 313 toward the heat exchanger 12, 13 is likely to be sucked into the working chambers 311 of the heat exchange container 31 before the refrigerant flows into the heat exchanger 12, 13.

In this case, the heat of the refrigerant discharged from each of the ports 312, 313 toward each of the heat exchangers 12, 13 is only transmitted to the refrigerant in each of the heat exchangers 12, 13 via the refrigerant in the piping and a long time is required to make the temperature of the refrigerant in each of the heat exchangers 12, 13 to have a desired temperature.

In contrast to this, in the present embodiment, the high temperature side ports 312 of the heat exchange container 31 is connected to the heating heat exchanger 13 by the high temperature side refrigerant circuit 4 constructed in such a way that the refrigerant discharged from the high temperature side ports 312 passes through the heating heat exchanger 13 and again returns to the high temperature side ports 312, so that the refrigerant discharged from the high temperature side ports 312 of the heat exchange container 31 can be made to flow into the heating heat exchanger 13.

Similarly, the low temperature side ports 313 of the heat exchange container 31 is connected to the cooling heat exchanger 12 by the low temperature side refrigerant circuit 5 constructed in such a way that the refrigerant discharged from the low temperature side ports 313 passes through the cooling heat exchanger 12 and again returns to the low temperature side ports 313, so that the refrigerant discharged from the low temperature side ports 313 of the heat exchange container 31 can be made to flow into the cooling heat exchanger 12.

Further, the present embodiment employs a construction in which each of the ports 312, 313 of the heat exchange container 31 is provided with the suction valve opened when the refrigerant is sucked into the working chambers 311 of the heat exchange container 31 and the discharge valve opened when the refrigerant is discharged from the working chambers 311 of the heat exchange container 31.

For this reason, after the magnetic field is applied to the magnetic working material 30, the refrigerant near the high temperature side ports 312, whose temperature is increased by the hot heat generated in the magnetic working material 30 by applying the magnetic field, can be made to surely flow into the heating heat exchanger 13 and the refrigerant flowing out of the heating heat exchanger 13 can be sucked into the working chambers 311 of the heat exchange container 31.

Similarly, after the magnetic field is removed from the magnetic working material 30, the refrigerant near the low temperature side ports 313, whose temperature is decreased by the cold heat generated in the magnetic working material 30 by removing the magnetic field can be made to surely flow into the cooling heat exchanger 12 and the refrigerant flowing out of the cooling heat exchanger 12 can be sucked into the working chambers 311 of the heat exchange container 31.

Further, the present embodiment employs the construction in which the rotary shafts 321a, 321b of the magnetic field applying and removing device 32 are coupled to the drive shaft 341 of the refrigerant pump 34 and in which the refrigerant pump 34 is driven by the electric motor 35 which is the drive part of the magnetic field applying and removing device 32.

According to this construction, the drive source of the magnetic field applying and removing device 32 can be made common to the drive source of the refrigerant pump 34, so that the magnetic refrigeration system 2 can be realized by a simple construction. Accordingly, the power consumption in the magnetic refrigeration system 2 can be restricted from increasing, and the COP of the magnetic refrigeration system 2 can be further improved.

Second Embodiment

Figure 8:
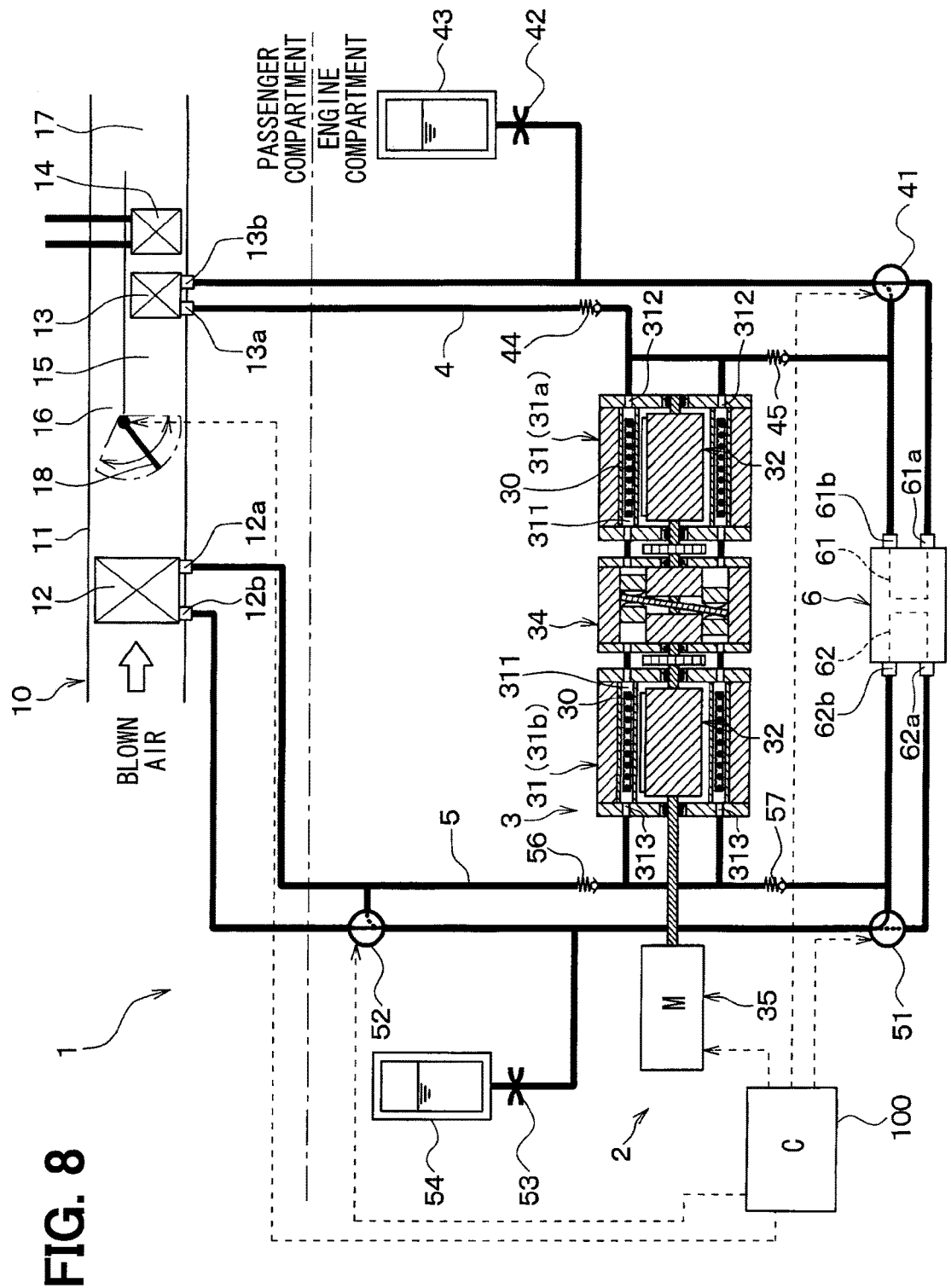
FIG. 8 is a general construction diagram illustrating a vehicle air conditioning device according to a second embodiment.

Next, a second embodiment of the present disclosure will be described on the basis of FIG. 8. FIG. 8 is a general construction diagram of a vehicle air conditioning device 1 of the present embodiment. In the present embodiment, the descriptions of parts identical or equivalent to the parts in the first embodiment will be omitted or simplified.

The first embodiment described above employs the following construction: that is, the refrigerant suction part 312a, 313a of the container 31a, 31b is provided with the suction valve 312c, 313c; and the refrigerant discharge part 312b, 313b of the container 31a, 31b is provided with the discharge valve 312d, 313d, whereby in each of the refrigerant circuits 4, 5, the refrigerant flows in one direction in order of the refrigerant ports 312, 313 of the container 31a, 31b, the refrigerant flow-in port 12a, 13a of the heat exchanger 12, 13, the refrigerant flow-out port 12b, 13b of the heat exchanger 12, 13, and the refrigerant ports 312, 313 of the container 31a, 31b.

In contrast to this, the present embodiment employs a construction in which the suction valve 312c, 313c and the discharge valve 312d, 313d are eliminated, instead, the high temperature side refrigerant circuit 4 is provided with check valves 44, 45 and the low temperature side refrigerant circuit 5 is provided with check valves 56, 57.

Specifically, as shown in FIG. 8, in the high temperature side refrigerant circuit 4, a first check valve 44 for allowing the refrigerant to flow from the refrigerant ports 312 of the high temperature side container 31a to the refrigerant flow-in port 13a of the heating heat exchanger 13 is interposed between the refrigerant ports 312 of the high temperature side container 31a and the refrigerant flow-in port 13a of the heating heat exchanger 13. Further, in the high temperature side refrigerant circuit 4, a second check valve 45 for allowing the refrigerant to flow from the refrigerant flow-out port 13b of the heating heat exchanger 13 to the refrigerant ports 312 of the high temperature side container 31a is interposed between the refrigerant flow-out port 13b of the heating heat exchanger 13 and the refrigerant ports 312 of the high temperature side container 31a.

On the other side, in the low temperature side refrigerant circuit 5, a third check valve 56 for allowing the refrigerant to flow from the refrigerant ports 313 of the low temperature side container 31b to the refrigerant flow-in port 13a of the cooling heat exchanger 12 is interposed between the refrigerant ports 313 of the low temperature side container 31b and the refrigerant flow-in port 13a of the cooling heat exchanger 12. Further, in the low temperature side refrigerant circuit 5, a fourth check valve 57 for allowing the refrigerant to flow from the refrigerant flow-out port 13b of the cooling heat exchanger 12 to the refrigerant ports 313 of the low temperature side container 31b is interposed between the refrigerant flow-out port 13b of the cooling heat exchanger 12 and the refrigerant ports 313 of the low temperature side container 31b.

According to this construction, after the magnetic field is applied to the magnetic working material 30, the refrigerant near the high temperature side ports 312, whose temperature is increased by the hot heat generated in the magnetic working material 30 by applying the magnetic field, can be made to surely flow into the heating heat exchanger 13 and the refrigerant flowing out of the heating heat exchanger 13 can be sucked into the working chambers 311 of the heat exchanger container 31.

Similarly, after the magnetic field is removed from the magnetic working material 30, the refrigerant near the low temperature side ports 313, whose temperature is decreased by the cold heat generated in the magnetic working material 30 by removing the magnetic field, can be made to surely flow into the cooling heat exchanger 12 and the refrigerant flowing out of the cooling heat exchanger 12 can be sucked into the working chambers 311 of the heat exchanger container 31.

In this regard, in the present embodiment, the first and the second check valves 44, 45 disposed in the high temperature side refrigerant circuit 4 may correspond to a first backward flow preventing part of the present disclosure, and the third and the fourth check valves 56, 57 disposed in the low temperature side refrigerant circuit 5 may correspond to a second backward flow preventing part of the present disclosure.

Third Embodiment

Figure 9:
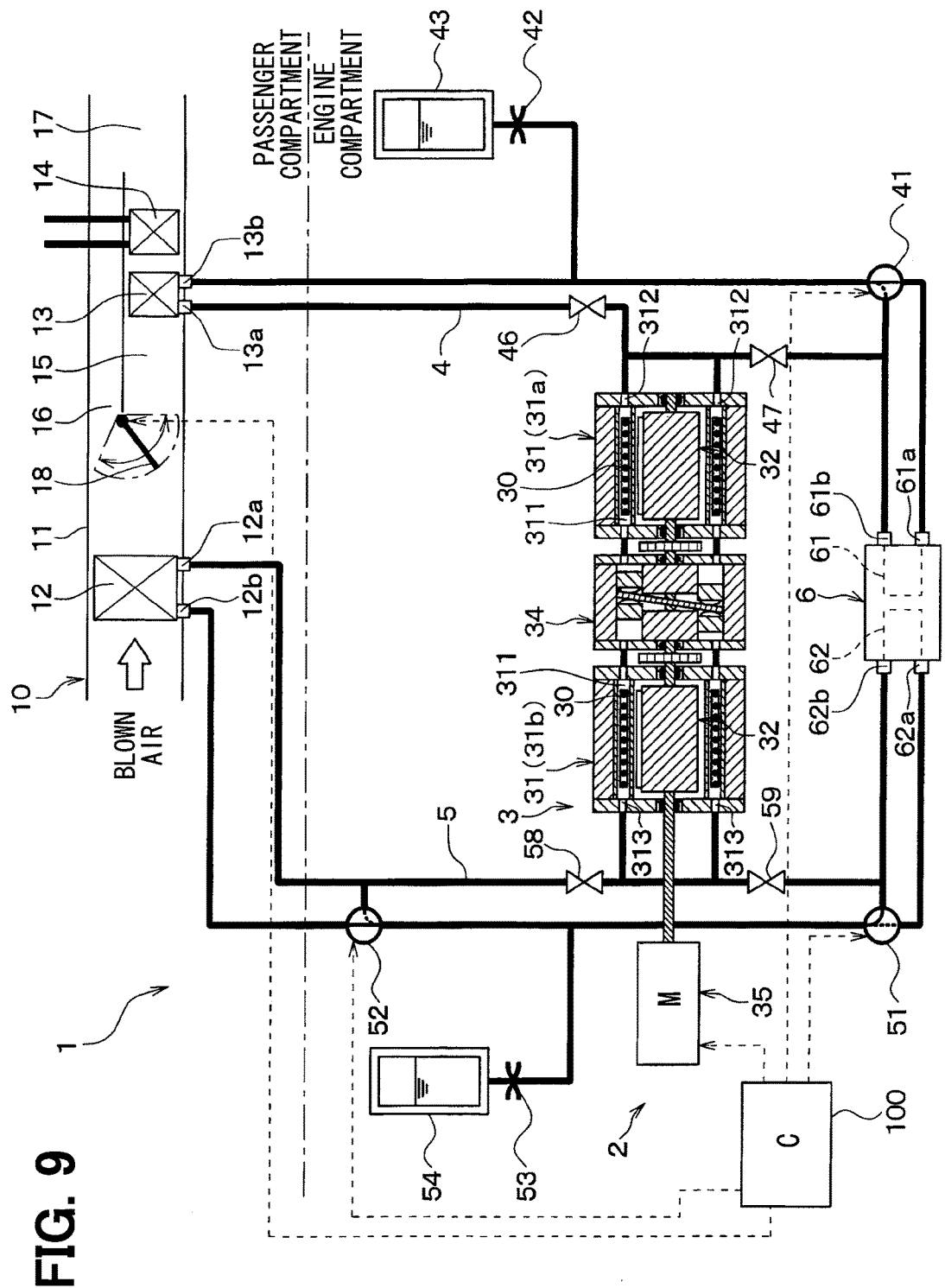
FIG. 9 is a general construction diagram illustrating a vehicle air conditioning device according to a third embodiment.

Next, a third embodiment of the present disclosure will be described on the basis of FIG. 9. FIG. 9 is a general construction diagram of a vehicle air conditioning device 1 of the present embodiment. In the present embodiment, the descriptions of parts identical or equivalent to the parts in the first and the second embodiments will be omitted or simplified.

The second embodiment described above employs a construction in which the high temperature side refrigerant circuit 4 is provided with the first and the second check valves 44, 45 and in which the low temperature side refrigerant circuit 5 is provided with the third and the fourth check valves 56, 57. In contrast to this, the present embodiment employs a construction in which the refrigerant circuit 4 is provided with opening and closing valves 46, 47 and the refrigerant circuit 5 is provided with opening and closing valves 58, 59, the opening and closing valves being opened or closed according to a control signal from the air conditioning control device 100, in place of the respective check valves 44, 45 and 56, 57.

Specifically, as shown in FIG. 9, in the high temperature side refrigerant circuit 4, a first opening and closing valve 46 is interposed between the refrigerant ports 312 of the high temperature side container 31a and the refrigerant flow-in port 13a of the heating heat exchanger 13, and a second opening and closing valve 47 is interposed between the refrigerant flow-out port 13b of the heating heat exchanger 13 and the refrigerant ports 312 of the high temperature side container 31a.

In this regard, the first opening and closing valve 46 is controlled by the air conditioning control device 100 in such a way as to allow the refrigerant to flow only from the refrigerant ports 312 of the high temperature side container 31a to the refrigerant flow-in port 13a of the heating heat exchanger 13. Further, the second opening and closing valve 47 is controlled by the air conditioning control device 100 in such a way as to allow the refrigerant to flow only from the refrigerant flow-out port 13b of the heating heat exchanger 13 to the refrigerant ports 312 of the high temperature side container 31a.

On the other hand, in the low temperature side refrigerant circuit 5, a third opening and closing valve 58 is interposed between the refrigerant ports 313 of the low temperature side container 31b and the refrigerant flow-in port 13a of the cooling heat exchanger 12, and a fourth opening and closing valve 59 is interposed between the refrigerant flow-out port 13b of the cooling heat exchanger 12 and the refrigerant ports 313 of the low temperature side container 31b.

In this regard, the third opening and closing valve 58 is controlled by the air conditioning control device 100 in such a way as to allow the refrigerant to flow only from the refrigerant ports 313 of the low temperature side container 31b to the refrigerant flow-in port 13a of the cooling heat exchanger 12. Further, the fourth opening and closing valve 59 is controlled by the air conditioning control device 100 in such a way as to allow the refrigerant to flow only from the refrigerant flow-out port 13b of the cooling heat exchanger 12 to the refrigerant ports 313 of the low temperature side container 31b.

Also according to this construction, the same advantages as the second embodiment can be produced. In this regard, the first and the second opening and closing valves 46, 47 disposed in the high temperature side refrigerant circuit 4 in the present embodiment may correspond to the first backward flow preventing part of the present disclosure, and the third and the fourth opening and closing valves 58, 59 disposed in the low temperature side refrigerant circuit 5 in the present embodiment may correspond to the second backward flow preventing part of the present disclosure.

Fourth Embodiment

Figure 10:
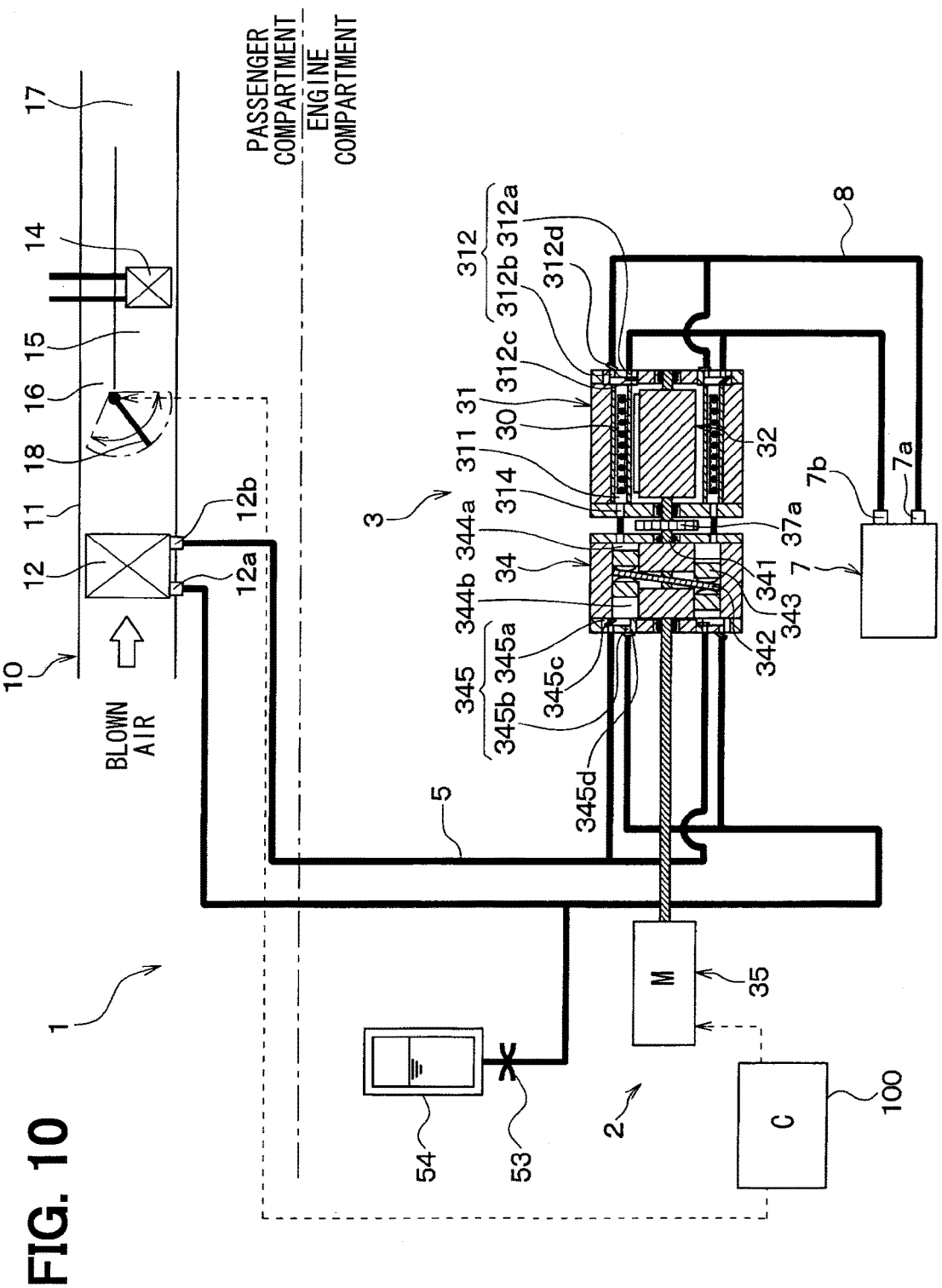
FIG. 10 is a general construction diagram illustrating a vehicle air conditioning device according to a fourth embodiment.

Next, a fourth embodiment of the present disclosure will be described on the basis of FIG. 10. FIG. 10 is a general construction diagram of a vehicle air conditioning device 1 of the present embodiment.

In the present embodiment, the magnetic refrigeration system 2 having a refrigerant circuit of only the cooling mode for cooling the interior of passenger compartment will be described. In this regard, in the present embodiment, the descriptions of parts identical or equivalent to the parts in the first to the third embodiments will be omitted or simplified.

The magnetic refrigeration system 2 of the present embodiment, as shown in FIG. 10, is constructed of: the magnetic refrigerator 3; a heat radiation side refrigerant circuit (first refrigerant circulation circuit) 8 for circulating the refrigerant having temperature increased by the hot heat generated by the magnetic refrigerator 3 to a heat radiator (first heat exchanger) 7; and a low temperature side refrigerant circuit (second refrigerant circulation circuit) 5 for circulating the refrigerant having temperature decreased by the clod heat generated by the magnetic refrigerator 3 to the cooling heat exchanger (second heat exchanger) 12.

The heat exchange container 31 of the magnetic refrigerator 3 of the present embodiment is constructed of a hollow cylindrical container having working chambers 311 formed therein, the working chamber 311 having the magnetic working material 30 received therein and having the refrigerant flowing therethrough. The heat exchange container 31 has the refrigerant pump 34 coaxially arranged on one end side thereof.

The heat exchange container 31 has the refrigerant ports 312 formed in its end face opposite to the refrigerant pump 34, and has communication passages 314 formed in its end face adjacent to the refrigerant pump 34, the communication passage 314 communicating with the cylinder bore 344 of the refrigerant pump 34.

The refrigerant pump 34 of the present embodiment is constructed of a first bore part 344a corresponding to the communication passages 314 of the heat exchange container 31, and a second bore part 344b communicating with the low temperature side refrigerant circuit 5 which will be described later. In this regard, the cylinder bore 344 is constructed in such a way that the refrigerant in the first bore part 344a and the refrigerant in the second bore part 344b can flow, whereby the heat of the first bore part 344a is directly transported to the second bore part 344b.

In this regard, each communication passage 345 for making the second bore part 344b to communicate with the low temperature side refrigerant circuit 5 is constructed of a refrigerant suction part 345a for sucking the refrigerant from the low temperature side refrigerant circuit 5 and a refrigerant discharge part 345b for discharging the refrigerant to the low temperature side refrigerant circuit 5. The refrigerant suction part 345a of the communication passage 345 is provided with a suction valve 345c opened when the refrigerant is sucked, and the refrigerant discharge part 345b of the communication passage 345 is provided with a discharge valve 345d opened when the refrigerant is discharged. Here, in the present embodiment, the communication passages 345 communicating with the low temperature side refrigerant circuit 5 in the refrigerant pump 34 construct refrigerant ports corresponding to the refrigerant ports 312 in the heat exchange container 31.

The heat radiation side refrigerant circuit 8 is a refrigerant circulation circuit for introducing the refrigerant discharged from the refrigerant discharge parts 312b of the refrigerant ports 312 in the heat exchange container 31 into a refrigerant flow-in port 7a of the heat radiator 7 and for returning the refrigerant flowing out of a refrigerant flow-out port 13b of the heat radiator 7 to the refrigerant suction parts 312a of the refrigerant ports 312 in the heat exchange container 31.

Thus, in the heat radiation side refrigerant circuit 8, the refrigerant is circulated in order of the refrigerant discharge parts 312b of the heat exchange container 31, the heat radiator 7, and the refrigerant suction parts 312a of the heat exchange container 31. In this regard, the heat radiator 7 is a heat exchanger that is arranged in the engine compartment and that makes the refrigerant flowing therein through the refrigerant flow-in port 7a exchange heat with the outside air.

Further, the low temperature side refrigerant circuit 5 of the present embodiment is a refrigerant circulation circuit for introducing the refrigerant discharged from the refrigerant discharge parts 345b of the communication passages 345 in the refrigerant pump 34 into the refrigerant flow-in port 12a of the cooling heat exchanger 12 and for returning the refrigerant flowing out of the refrigerant flow-out port 12b of the cooling heat exchanger 12 to the refrigerant suction parts 345a of the communication passages 345 in the refrigerant pump 34.

Thus, in the low temperature side refrigerant circuit 5, the refrigerant is circulated in order of the refrigerant discharge parts 345b of the communication passages 345 in the refrigerant pump 34, the cooling heat exchanger 12, and the refrigerant suction parts 345a of the communication passages 345 in the refrigerant pump 34.

Next, the operation of the magnetic refrigerator 3 in the refrigeration system 2 of the present embodiment will be generally described.

When the piston 343 in the first bore part 344a in the refrigerant pump 34 is positioned near the bottom dead center and the permanent magnet 323a comes near to the upper working chambers 311 of the heat exchange container 31, the magnetic field is applied to the magnetic working material 30 received in the upper working chambers 311 and the refrigerant in the upper working chambers 311 is increased in temperature (the magnetic field applying process). At this time, the piston 343 in the second bore part 344b is positioned near the top dead center.

Then, when the piston 343 in the first bore part 344a is moved from the bottom dead center to the top dead center, the refrigerant in the upper working chambers 311 is transferred from the refrigerant pump 34 to the refrigerant ports 312 and the high temperature refrigerant near the refrigerant discharge parts 312b is discharged to the heat radiator 7 (refrigerant discharging process). At this time, the piston 343 in the second bore part 344b is moved from the top dead center to the bottom dead center and the refrigerant flowing out of the cooling heat exchanger 12 is sucked into the second bore part 344b via the refrigerant suction parts 345a of the communication passages 345.

Then, when the piston 343 in the first bore part 344a is positioned near the top dead center and the permanent magnet 323a is moved away from the upper working chambers 311 in the heat exchange container 31, the magnetic field is removed from the magnetic working material 30 received in the upper working chambers 311, whereby the refrigerant in the upper working chambers 311 is decreased in temperature (magnetic field removing process). At this time, the piston 343 in the second bore part 344b is positioned near the bottom dead center. In this regard, the refrigerant in the first bore part 344a whose temperature is decreased by removing the magnetic field from the magnetic working material 30 flows into the second bore part 344b, whereby the refrigerant in the second bore 344b is decreased in temperature.

Then, the piston 343 in the first bore part 344a is moved from the top dead center to the bottom dead center and the refrigerant flowing out of the heating heat exchanger 13 is sucked into portions near the refrigerant suction parts 312a. At this time, the piston 343 in the second bore part 344b is moved from the bottom dead center to the top dead center and the refrigerant in the second bore part 344b is discharged to the cooling heat exchanger 12 via the refrigerant discharge parts 345b of the communication passages 345.

In this way, by these four processes of the magnetic field applying process, the refrigerant discharging process, the magnetic field removing process, and the refrigerant sucking process, the cold heat generated by the magnetocaloric effect of the magnetic working material 30 received in the upper working chambers 311 of the heat exchange container 31 is transported to the cooling heat exchanger 12. In this way, the blown air to be blown into the passenger compartment can be cooled in the cooling heat exchanger 12. In this regard, the hot heat generated by the magnetocaloric effect of the magnetic working material 30 received in the upper working chambers 311 of the heat exchange container 31 is transported to the heat radiator 7 and is radiated to the outside air.

According to the present embodiment described above, the refrigerant having temperature decreased by the cold heat generated in the magnetic working material 30 can be made to directly flow into the cooling heat exchanger 12, so that a heat exchanger loss caused when the cold heat generated in the magnetic working material 30 is transported can be reduced and hence the COP of the magnetic refrigeration system can be improved.

In this regard, although the magnetic refrigeration system 2 having the refrigerant circuit of only the cooling mode for cooling the interior of the passenger compartment has been described in the present embodiment, the magnetic refrigeration system 2 may have a construction having a refrigerant circuit of only the heating mode for heating the interior of the passenger compartment. In this case, the following construction is recommended: for example, the heat radiator 7 of the present embodiment is arranged in the case 11 of the indoor air conditioning unit 10 and is functioned as a heating heat exchanger for heating the blown air to be blown into the passenger compartment, and the cooling heat exchanger 12 is arranged in the engine compartment and is functioned as a heat absorber for exchanging heat with the outside air.

Fifth Embodiment

Figure 11:
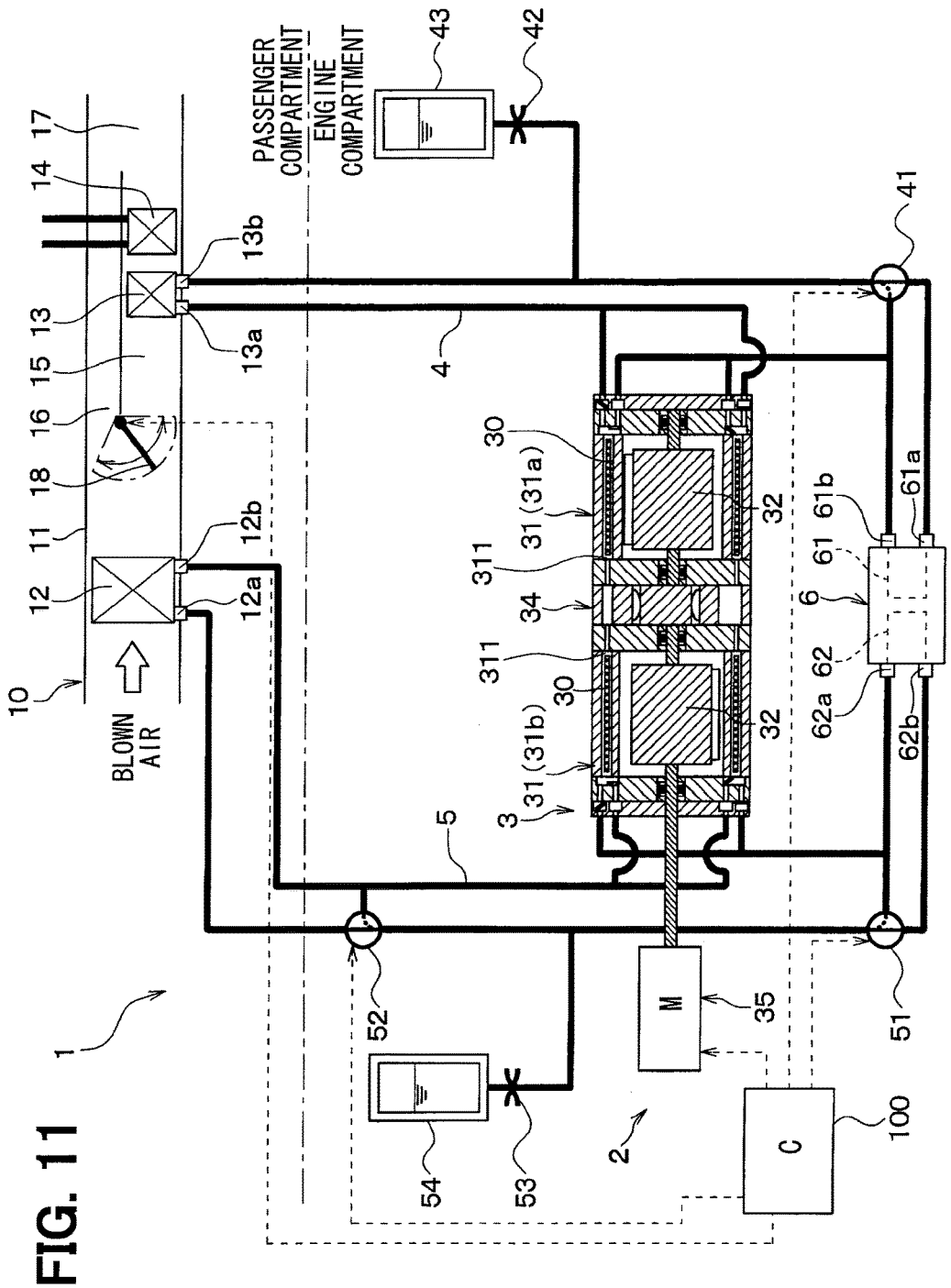
FIG. 11 is a general construction diagram illustrating a vehicle air conditioning device according to a fifth embodiment.

Next, a fifth embodiment of the present disclosure will be described on the basis of FIG. 11 and FIG. 12. FIG. 11 is a general construction diagram of a vehicle air conditioning device 1 of the present embodiment, and FIG. 12 is an enlarged view of a magnetic refrigerator of the present embodiment.

The present embodiment is different from the first to the fourth embodiments in the specific construction of the one and the other refrigerant ports 312, 313 in the magnetic refrigerator 3 and in the specific construction of the refrigerant pump 34. In this regard, in the present embodiment, the descriptions of parts identical or equivalent to the parts in the first to the fourth embodiments will be omitted or simplified.

Figure 12:
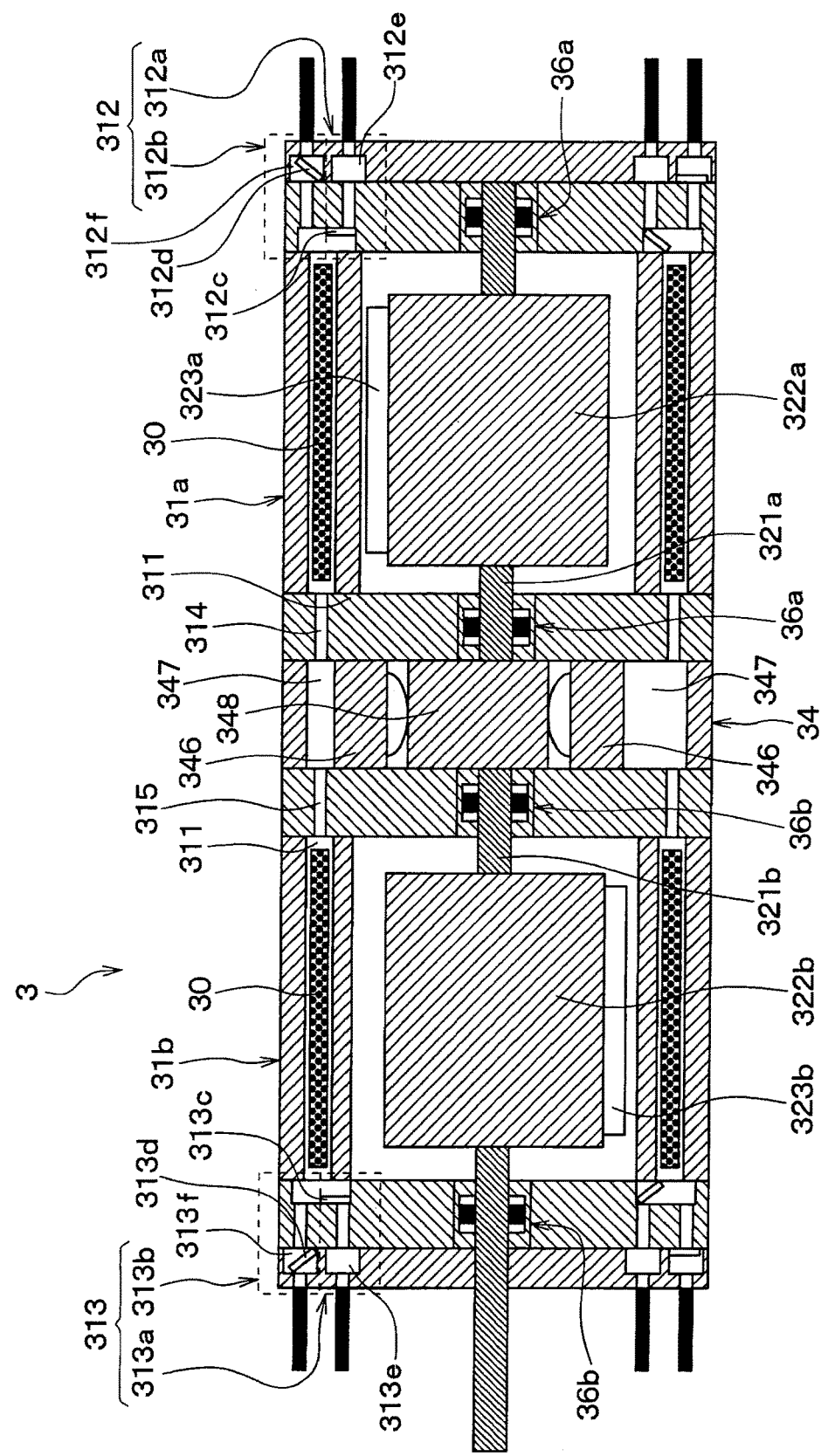
FIG. 12 is an enlarged view illustrating a magnetic refrigerator according to the fifth embodiment.

As shown in FIG. 11 and FIG. 12, in each of the refrigerant ports 312, 313 of the present embodiment, the respective refrigerant suction parts 312a, 313a are disposed on the same circumference when viewed from the longitudinal direction of the heat exchange container 31. Further, the respective refrigerant discharge parts 312b, 313b are disposed on the same circumference when viewed from the longitudinal direction of the heat exchange container 31. In the present embodiment, the refrigerant discharge parts 312b, 313b are arranged in such a way as to be positioned on the outer side in the radial direction of the heat exchange container 31 as compared with the refrigerant suction parts 312a, 313a. Here, the refrigerant suction parts 312a, 313a may be arranged in such a way as to be positioned on the outer side in the radial direction of the heat exchange container 31 as compared with the refrigerant discharge parts 312b, 313b.

Each of the refrigerant suction parts 312a, 313a is provided with the suction valve 313c and each of the refrigerant discharge parts 312b, 313b is provided with the discharge valve 313d. Here, the respective suction valves 313c are disposed in such a way as to be positioned on the same circumference when viewed from the longitudinal direction of the heat exchange container 31 in correspondence to the refrigerant suction parts 312a, 313a. Similarly, the respective discharge valves 313d are disposed in such a way as to be positioned on the same circumference when viewed from the longitudinal direction of the heat exchange container 31 in correspondence to the refrigerant discharge parts 312b, 313b.

The respective refrigerant suction parts 312a in the high temperature side ports 312 communicate with each other via a suction side manifold 312e, whereas the respective discharge parts 312b in the high temperature side ports 312 communicate with each other via a discharge side manifold 312f. Similarly, the respective refrigerant suction parts 313a in the low temperature side ports 313 communicate with each other via a suction side manifold 313e, whereas the respective discharge parts 313b in the low temperature side ports 313 communicate with each other via a discharge side manifold 313f. In this regard, a heat insulating material (not shown) is arranged between the suction side manifold 312e and the discharge side manifold 312f in the high temperature side ports 312, which hence inhibits heat transfer between the both manifolds 312e and 312f. Similarly, a heat insulating material (not shown) is arranged between the suction side manifold 313e and the discharge side manifold 313f in the low temperature side ports 313, which hence inhibits heat transfer between the both manifolds 313e and 313f.

Here, the volume of a space constructing each of the refrigerant suction parts 312a, 313a and the refrigerant discharge parts 312b, 313b in the heat exchange container 31 is made smaller than the volume of the refrigerant discharged at one time (that is, cylinder volume) in the refrigerant pump 34, which will be described later. Here, the volume of the space constructing each of the refrigerant suction parts 312a, 313a and the refrigerant discharge parts 312b, 313b in the heat exchange container 31 corresponds to the total volume of the volume (dead volume) of a space in which each of the valves 312c, 313c, 312d, 313d is arranged (including the movable range of each valve).

Further, the permanent magnets 323a, 323b constructing a portion of the magnetic field applying and removing device 32 are disposed at positions shifted by 180° from each other in the outer circumferences of the rotors 322a, 322b, respectively. For example, as shown in FIG. 12, in the case where one permanent magnet 323a is positioned on the upper side, the other permanent magnet 323b is positioned on the lower side.

Next, describing the refrigerant pump 34 of the present embodiment, the present embodiment employs a radial piston pump of a multi-cylinder type in which the pistons 346 are slid in the radial direction with respect to the axial direction of the rotary shaft 321a, 321b.

Specifically, the refrigerant pump 34 of the present embodiment is constructed of a cylindrical housing 340, a drive shaft rotatably supported in the housing 340 and having an eccentric cam 348 integrally formed, a plurality of cylinder bores 347 formed radially in the housing 340, and the pistons 346 reciprocated in the respective cylinder bores 347 according to the rotation of the eccentric cam 348. Here, in the present embodiment, the heat exchange container 31 is integrated with the housing 340 of the refrigerant pump 34.

As are the cases with the refrigerant pump described in the above-mentioned embodiments, the refrigerant pump 34 of the present embodiment is constructed in such a way as to suck or discharge the refrigerant from or into the respective containers 31a, 31b in synchronization with applying and removing the magnetic field to and from the magnetic working material 30.

For example, when the magnetic field is applied to the magnetic working material 30 in the working chambers 311 positioned on the upper side in the high temperature side container 31a and the magnetic field is removed from the magnetic working material 30 in the working chambers 311 positioned on the upper side in the low temperature side container 31b, the refrigerant pump 34 discharges the refrigerant in sequence into the respective working chambers 311 positioned on the upper side in the respective containers 31a, 31b and sucks the refrigerant in sequence from the respective working chambers 311 positioned on the lower side in the respective containers 31a, 31b.

On the other hand, when the magnetic field is removed from the magnetic working material 30 in the working chambers 311 positioned on the upper side in the high temperature side container 31a and the magnetic field is applied to the magnetic working material 30 in the working chambers 311 positioned on the upper side in the low temperature side container 31b, the refrigerant pump 34 sucks the refrigerant in sequence from the respective working chambers 311 positioned on the upper side in the respective containers 31a, 31b and discharges the refrigerant in sequence into the respective working chambers 311 positioned on the lower side in the respective containers 31a, 31b.

In this way, in the magnetic refrigerator 3, the refrigerant can be sucked or discharged in sequence from or into the respective working chambers 311 in the respective containers 31a, 31b in synchronization with applying and removing the magnetic field to and from the magnetic working material 30, so that the refrigerant near the refrigerant discharge parts 312b, 313b in the respective containers 31a, 31b can be continuously discharged to the outside.

Next, the operation of the magnetic refrigerator 3 according to the present embodiment will be generally described. When the piston 346 in the cylinder bore 347 positioned on the upper side in the refrigerant pump 34 is positioned near the bottom dead center and the permanent magnet 323a comes near to the upper working chambers 311 positioned on the upper side of the high temperature side container 31a, the magnetic field is applied in sequence to the magnetic working material 30 received in the upper working chambers 311 positioned on the upper side (that is, the magnetic working material 30 is magnetized, the magnetic field applying process). At this time, the magnetic working material 30 generates heat by the magnetocaloric effect, whereby the refrigerant in the respective working chambers 311 positioned on the upper side is sequentially increased in temperature.

Then, the piston 346 in the cylinder bore 347 positioned on the upper side in the refrigerant pump 34 is moved from the bottom dead center to the top dead center and the refrigerant in the respective working chambers 311 positioned on the upper side is transferred from the refrigerant pump 34 to the high temperature side ports 312. At this time, the discharge valves 312d disposed at the refrigerant discharge parts 312b of the high temperature side ports 312 are opened and hence the high temperature refrigerant near the refrigerant discharge parts 312b is discharged to the heating heat exchanger 13 via the discharge side manifolds 312f (refrigerant discharging process).

Then, when the piston 346 in the cylinder bore 347 positioned on the upper side in the refrigerant pump 34 is positioned near the top dead center and the permanent magnet 323a is moved away from the respective working chambers 311 positioned on the upper side of the high temperature side container 31a, the magnetic field is removed from the magnetic working material 30 received in the respective working chambers 311 positioned on the upper side (that is, the magnetic working material 30 is demagnetized, magnetic field removing process).

Then, the piston 346 in the cylinder bore 347 positioned on the upper side in the refrigerant pump 34 is moved from the top dead center to the bottom dead center and the refrigerant in the respective working chambers 311 positioned on the upper side is transferred from the high temperature side ports 312 to the refrigerant pump 34. At this time, the suction valves 312c disposed at the refrigerant suction parts 312a of the high temperature side ports 312 are opened and the refrigerant flowing out of the heating heat exchanger 13 is sucked into portions near the refrigerant suction parts 312a via the suction side manifolds 312e (refrigerant sucking process). Then, when the piston 346 of the refrigerant pump 34 is returned to a position near the bottom dead center, there is again brought about the magnetic field applying process.

In this way, when these four processes of the magnetic field applying process, the refrigerant discharging process, the magnetic field removing process, and the refrigerant sucking process are repeated in sequence in the respective working chambers 311 of the high temperature side container 31a, the hot heat generated by the magnetocaloric effect of the magnetic working material 30 received in the respective working chambers 311 of the high temperature side container 31a can be transported to the heating heat exchanger 13.

On the other hand, when the magnetic field is applied to the magnetic working material 30 in the respective working chambers 311 positioned on the upper side of the high temperature side container 31a, in the respective working chambers 311 positioned on the upper side of the low temperature side container 31b, the permanent magnet 323b gets far away from the working chambers 311 and hence the magnetic field is removed in sequence from the magnetic working material 30 received in the respective working chambers 311 positioned on the upper side (magnetic field removing process).

Then, the piston 346 in the cylinder bore 347 positioned on the upper side in the refrigerant pump 34 is moved from the bottom dead center to the top dead center and the refrigerant in the respective working chambers 311 positioned on the upper side is transferred from the refrigerant pump 34 to the low temperature side ports 313. At this time, the discharge valves 313d disposed at the refrigerant discharge parts 313b of the low temperature side ports 313 are opened and the low temperature refrigerant near the refrigerant discharge parts 313b is discharged to the cooling heat exchanger 12 via the discharge side manifolds 313f (refrigerant discharging process).

Further, when the piston 346 in the cylinder bore 347 positioned on the upper side in the refrigerant pump 34 is moved near the top dead center and the permanent magnet 323b comes near the respective working chambers 311 positioned on the upper side of the low temperature side container 31b, the magnetic field is applied to the magnetic working material 30 received in the respective working chambers 311 positioned on the upper side (magnetic field applying process).

Then, the piston 346 in the cylinder bore 347 positioned on the upper side in the refrigerant pump 34 is moved from the top dead center to the bottom dead center and the refrigerant in the respective working chambers 311 positioned on the upper side is transferred from the low temperature side ports 313 to the refrigerant pump 34. At this time, the suction valves 313c disposed at the refrigerant suction parts 313a of the low temperature side ports 313 are opened and the refrigerant flowing out of the cooling heat exchanger 12 is sucked into portions near the refrigerant suction parts 313a via the suction side manifolds 313e (refrigerant sucking process). Then, when the piston 346 of the refrigerant pump 34 is returned near the bottom dead center, there is again brought about the magnetic field removing process.

In this way, when these four processes of the magnetic field removing process, the refrigerant discharging process, the magnetic field applying process, and the refrigerant sucking process are repeated in sequence in the respective working chambers 311 of the low temperature side container 31b, the cold heat generated by the magnetocaloric effect of the magnetic working material 30 received in the respective working chambers 311 of the low temperature side container 31b can be transported to the cooling heat exchanger 12.

In the magnetic refrigeration system of the present embodiment described above, the refrigerant having temperature increased by the hot heat generated in the magnetic working material 30 can be made to directly flow into the heating heat exchanger 13, and the refrigerant having temperature decreased by the cold heat generated in the magnetic working material 30 can be made to directly flow into the cooling heat exchanger 12, so that the same advantages as the first embodiment described above can be produced.

In addition to this, in the present embodiment, the volume of a space constructing each of the refrigerant suction parts 312a, 313a and the refrigerant discharge parts 312b, 313b in the heat exchange container 31 is made smaller than the volume of the refrigerant discharged at one time (that is, cylinder volume) in the refrigerant pump 34. For this reason, it is possible to prevent the refrigerant, whose temperature is increased by the hot heat generated in the magnetic working material 30, and the refrigerant, whose temperature is decreased by the cold heat generated in the magnetic working material 30, from remaining in the heat exchange container 31 and hence to efficiently transport the hot heat and the cold heat generated in the magnetic working material 30 to the outside of the heat exchange container 31.

Sixth Embodiment

Figure 13:
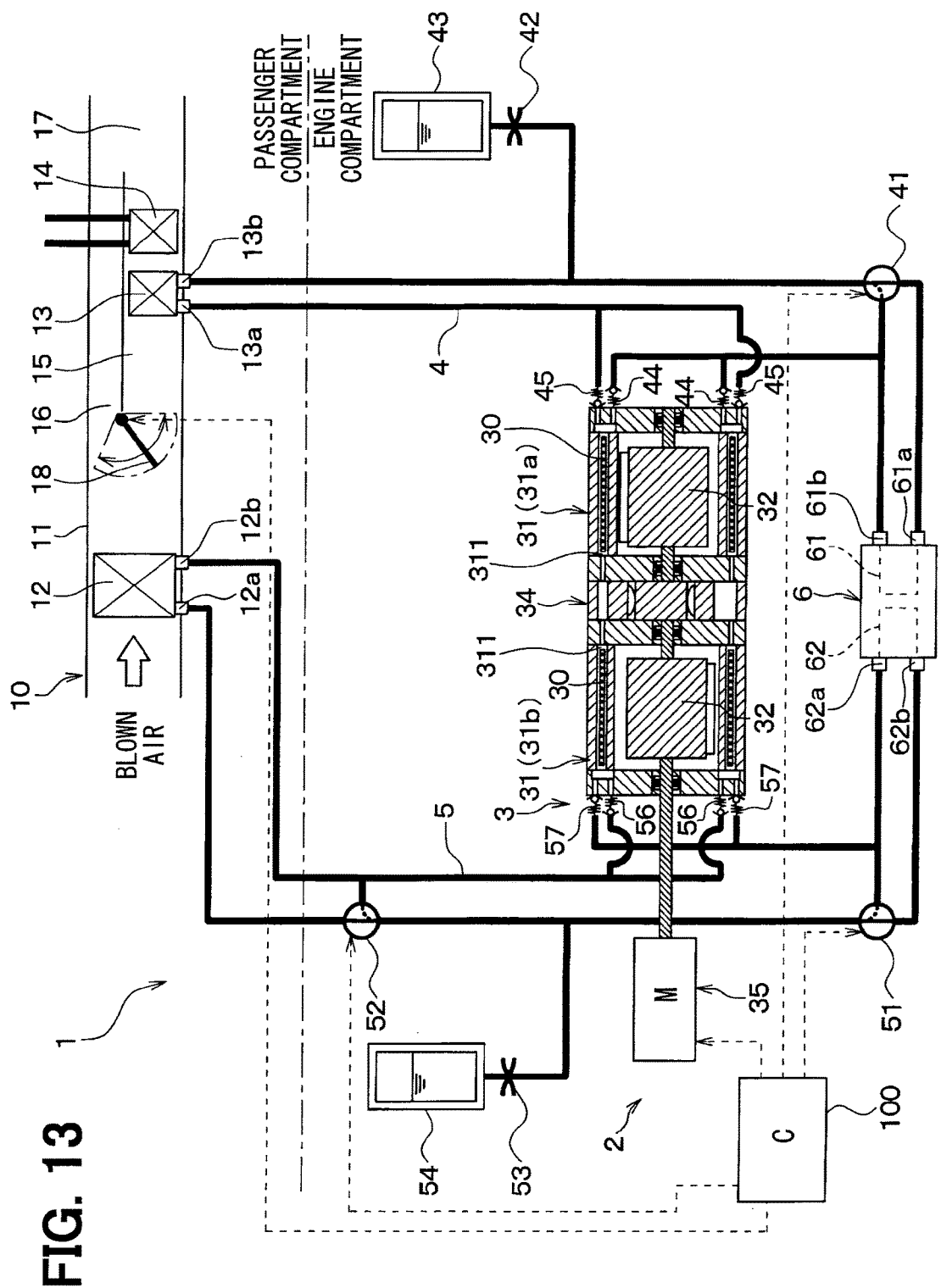
FIG. 13 is a general construction diagram illustrating a vehicle air conditioning device according to a sixth embodiment.

Next, a sixth embodiment of the present disclosure will be described on the basis of FIG. 13. FIG. 13 is a general construction diagram of a vehicle air conditioning device 1 of the present embodiment. Here, in the present embodiment, the descriptions of parts identical or equivalent to the parts in the first to the fifth embodiments will be omitted or simplified.

The present embodiment employs a construction in which the suction valves 312c, 313c, which are disposed respectively in the refrigerant suction parts 312a, 313a, and the discharge valves 312d, 313d, which are disposed respectively in the refrigerant discharge parts 312b, 313b, in the fifth embodiment are eliminated and in which check valves 44, 45 and 56, 57 are provided in place of those valves.

Specifically, each of the refrigerant suction parts 312a of the high temperature side container 31a is provided with a first check valve 44 for allowing the refrigerant to flow from the refrigerant flow-out port 13b of the heating heat exchanger 13 to each of the refrigerant suction parts 312a of the high temperature side container 31a, whereas each of the refrigerant discharge parts 312b of the high temperature side container 31a is provided with a second check valve 45 for allowing the refrigerant to flow from each of the refrigerant discharge parts 312b of the high temperature side container 31a to the refrigerant flow-in port 13a of the heating heat exchanger 13.

Similarly, each of the refrigerant suction parts 313a of the low temperature side container 31b is provided with a third check valve 56 for allowing the refrigerant to flow from the refrigerant flow-out port 12b of the cooling heat exchanger 12 to each of the refrigerant suction parts 313a of the low temperature side container 31b, whereas each of the refrigerant discharge parts 313b of the low temperature side container 31b is provided with a fourth check valve 57 for allowing the refrigerant to flow from each of the refrigerant discharge parts 313b of the low temperature side container 31b to the refrigerant flow-in port 12a of the cooling heat exchanger 12.

Here, the respective first and third check valves 44, 56 disposed at the respective refrigerant suction parts 312a, 313a are arranged in such a way as to be positioned on the same circumference when the heat exchange container 31 is viewed from the longitudinal direction in correspondence to the refrigerant suction parts 312a, 313a. Further, the respective second and fourth check valves 45, 57 disposed at the respective refrigerant discharge parts 312b, 313b are arranged in such a way as to be positioned on the same circumference when the heat exchange container 31 is viewed from the longitudinal direction in correspondence to the refrigerant discharge parts 312b, 313b.

Also according to this construction, the refrigerant having temperature increased by the hot heat generated in the magnetic working material 30 can be made to directly flow into the heating heat exchanger 13, and the refrigerant having temperature decreased by the cold heat generated in the magnetic working material 30 can be made to directly flow into the cooling heat exchanger 12, so that the same advantages as the fifth embodiment described above can be produced.

Seventh Embodiment

Figure 14:
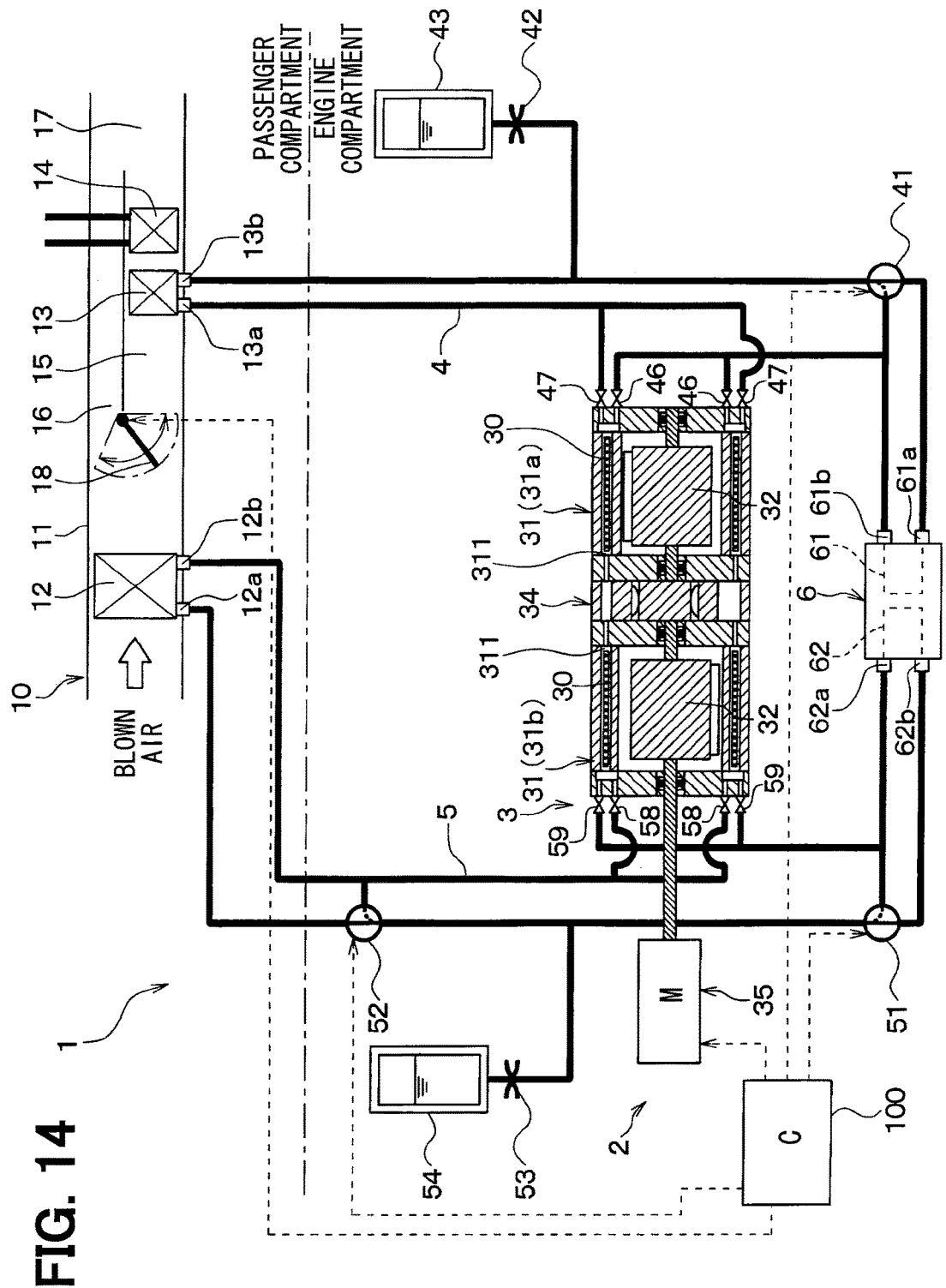
FIG. 14 is a general construction diagram illustrating a vehicle air conditioning device according to a seventh embodiment.

Next, a seventh embodiment of the present disclosure will be described on the basis of FIG. 14. FIG. 14 is a general construction diagram of a vehicle air conditioning device 1 of the present embodiment. Here, in the present embodiment, the descriptions of parts identical or equivalent to the parts in the first to the sixth embodiments will be omitted or simplified.

The present embodiment employs a construction in which the check valves 44, 45, which are disposed in the respective refrigerant suction parts 312a, 313a and the check valves 56, 57, which are disposed in the respective refrigerant discharge parts 312b, 313b, in the sixth embodiment are eliminated and in which opening and closing valves 46, 47 and 58, 59, which are opened or closed according to a control signal from the air conditioning control device 110, are provided in place of those check valves 44, 45 and 56, 57.

Specifically, each of the refrigerant suction parts 312a of the high temperature side container 31a is provided with a first opening and closing valve 46 controlled in such a way as to allow the refrigerant to flow only from the refrigerant flow-out port 13b of the heating heat exchanger 13 to each of the refrigerant suction parts 312a of the high temperature side container 31a, whereas each of the refrigerant discharge parts 312b of the high temperature side container 31a is provided with a second opening and closing valve 47 controlled in such a way as to allow the refrigerant to flow only from the refrigerant discharge part 312b of the high temperature side container 31a to the refrigerant flow-in port 13a of the heating heat exchanger 13.

Similarly, each of the refrigerant suction parts 313a of the low temperature side container 31b is provided with a third opening and closing valve 58 controlled in such a way as to allow the refrigerant to flow only from the refrigerant flow-out port 12b of the cooling heat exchanger 12 to each of the refrigerant suction parts 313a of the low temperature side container 31b, whereas each of the refrigerant discharge parts 313b of the low temperature side container 31b is provided with a fourth opening and closing valve 59 controlled in such a way as to allow the refrigerant to flow only from each of the refrigerant discharge parts 313b of the low temperature side container 31b to the refrigerant flow-in port 12a of the cooling heat exchanger 12.

In this regard, the respective first and third opening and closing valves 46, 58 disposed at the respective refrigerant suction parts 312a, 313a are arranged in such a way as to be positioned on the same circumference when the heat exchange container 31 is viewed from the longitudinal direction in correspondence to the refrigerant suction parts 312a, 313a. Further, the respective second and fourth opening and closing valves 47, 59 disposed at the respective refrigerant discharge parts 312b, 313b are arranged in such a way as to be positioned on the same circumference when the heat exchange container 31 is viewed from the longitudinal direction in correspondence to the refrigerant discharge parts 312b, 313b.

Also according to this construction, the refrigerant having temperature increased by the hot heat generated in the magnetic working material 30 can be made to directly flow into the heating heat exchanger 13, and the refrigerant having temperature decreased by the cold heat generated in the magnetic working material 30 can be made to directly flow into the cooling heat exchanger 12, so that the same advantages as the fifth and sixth embodiments described above can be produced.

Eighth Embodiment

In the fifth embodiment described above, as shown in FIG. 12, the suction valves 312c, 313c are arranged nearer to the working chambers 311 than the discharge valves 312d, 313d are. For this reason, when the refrigerant is discharged from each of the discharge valves 312d, 313d, the refrigerant remaining in a dead space around each of the suction valves 312c, 313c and the refrigerant discharged from each of the discharge valves 312c, 313c are likely to be mixed with each other and to unnecessarily exchange heat between them.

Hence, an eighth embodiment employs a construction in which the discharge valves 312d, 313d are arranged nearer to the working chambers 311 in the longitudinal direction of the heat exchange container 31 than the suction valves 312c, 313c are. In other words, the discharge valves 312d, 313d are arranged in the vicinity of the working chambers 311.

Figure 15:
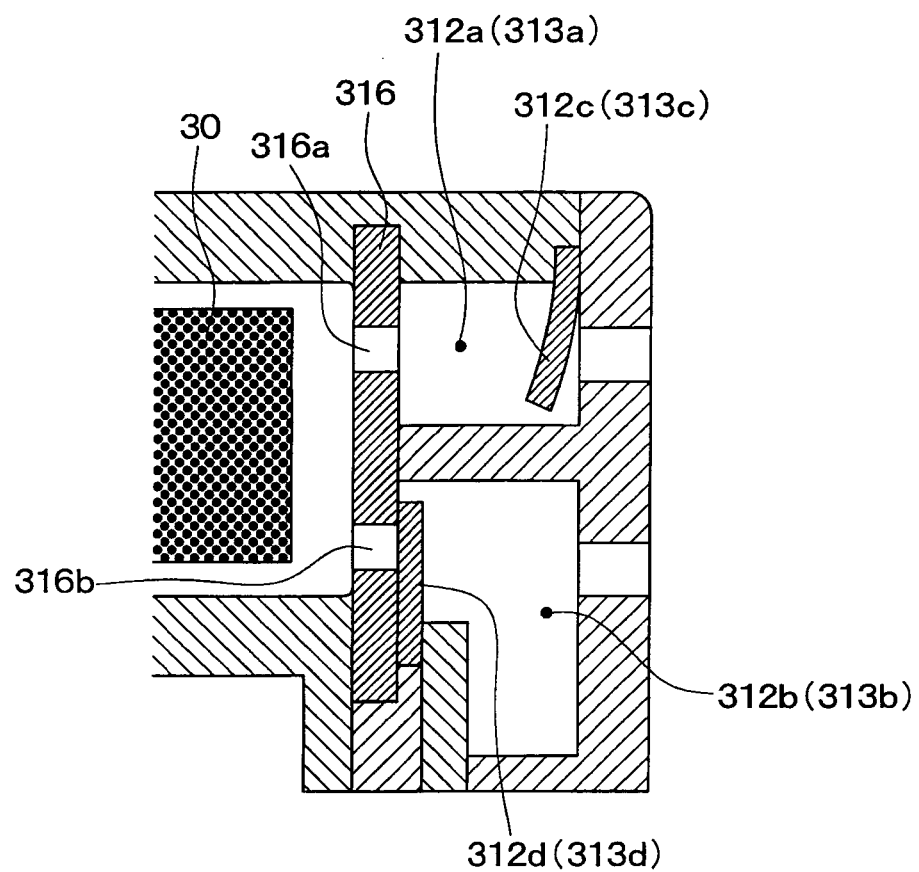
FIG. 15 is an enlarged view illustrating a main portion of a magnetic refrigerator according to an eighth embodiment.

As shown by a partial enlarged section view in FIG. 15, in the present embodiment, the refrigerant suction parts 312a, 313a are arranged on the outer side in the radial direction of the heat exchange container 31 as compared with the refrigerant discharge parts 312b, 313b.

A plate-shaped valve plate 316 having a suction hole 316a and a discharge hole 316b formed therein is arranged at a position adjacent to the working chambers 311. Here, the suction hole 316a formed in the valve plate 316 constructs a communication hole for sucking the refrigerant into the working chamber 311 and the discharge hole 316b constructs a communication hole for discharging the refrigerant from the working chamber 311.

The discharge valves 312d, 313d are arranged at positions adjacent to the valve plate 316 and the suction valves 312c, 313c are arranged at positions away from the valve plate 316 by a distance more than a movable range of the valve. In other words, the discharge valve 312d, 313d is constructed in such a way as to directly open or close the discharge hole 316b of the valve plate 316 and the suction valve 312c, 313c is constructed in such a way as to indirectly open or close the suction hole 316a of the valve plate 316.

In this way, when the discharge valve 312d, 313d is arranged close to the working chamber 311, it is possible to prevent an unnecessary heat exchange between the refrigerant remaining around the suction valve 312c, 313c and the refrigerant discharged from the working chamber 311 via the discharge valve 312d, 313d. This can reduce a heat exchange loss at the time of transporting the hot heat and the cold heat generated in the magnetic working material 30 and hence can improve the COP of the magnetic refrigeration system.

Ninth Embodiment

In the present embodiment will be described an example in which the respective valves 312c, 312d are constructed of a rotary valve and in which the respective valves 313c, 313d are constructed of a rotary valve.

Figure 16:
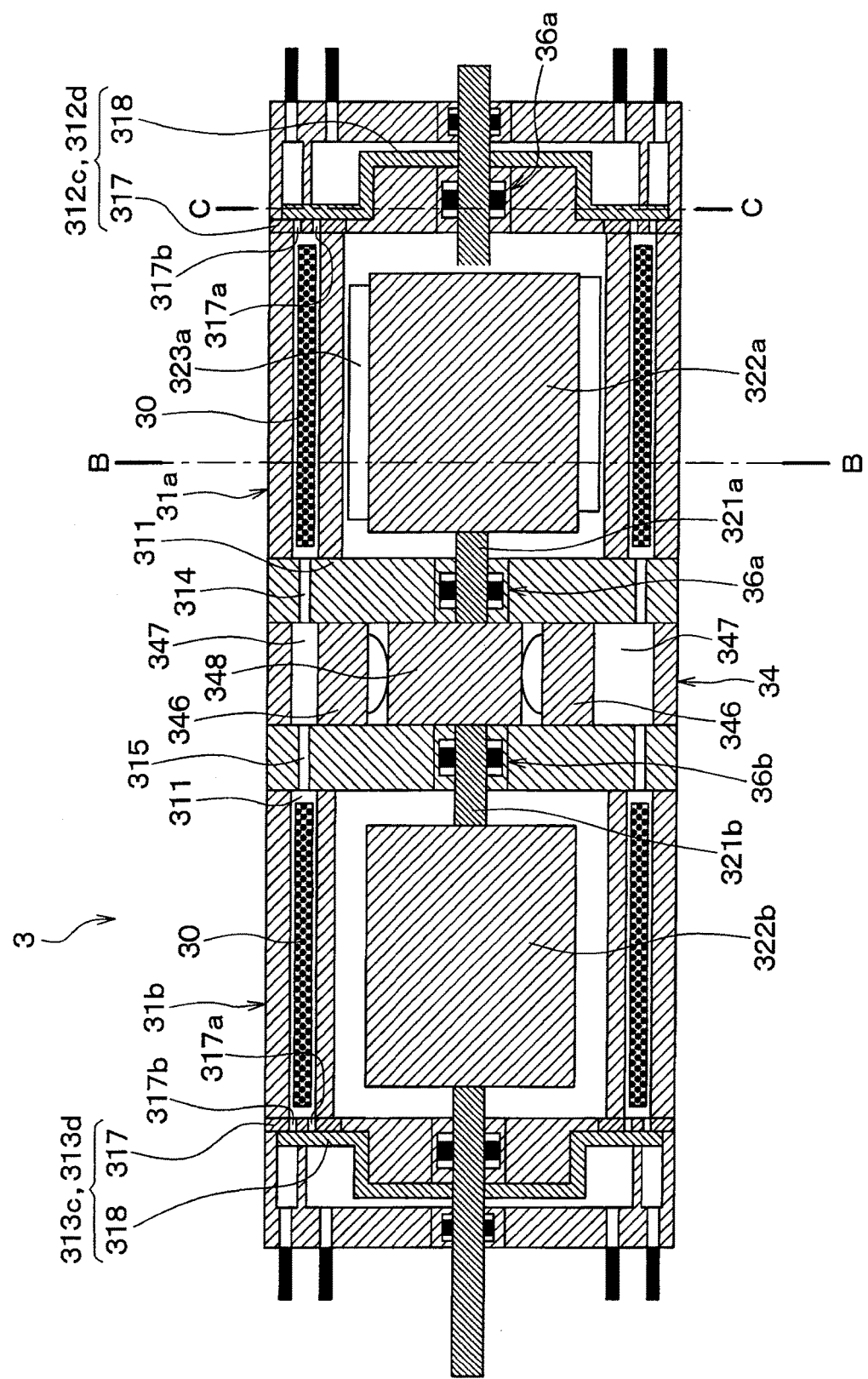
FIG. 16 is an enlarged view illustrating a magnetic refrigerator according to a ninth embodiment.

As shown by an enlarged view of a magnetic refrigerator 3 in FIG. 16, one rotary valve constructs the valves 312c, 312d and the other rotary valve constructs the valves 313c, 313d. Each of the rotary valves is constructed of a valve plate 317 and a rotary disk 318. The valve plate 317 is arranged adjacently to the working chambers 311, and has suction holes 317a and discharge holes 317b formed therein. Each of the suction holes 317a and discharge holes 317b communicates with each of the working chambers 311. The rotary disk 318 rotates in a circumferential direction of the heat exchange container 31 and opens or closes the suction holes 317a and the discharge holes 317b of the valve plate 317.

Each of the suction holes 317a formed in the valve plate 317 constructs a communication hole for sucking the refrigerant into each of the working chambers 311, and each of the discharge holes 317b constructs a communication hole for discharging the refrigerant from each of the working chambers 311.

Figure 17:
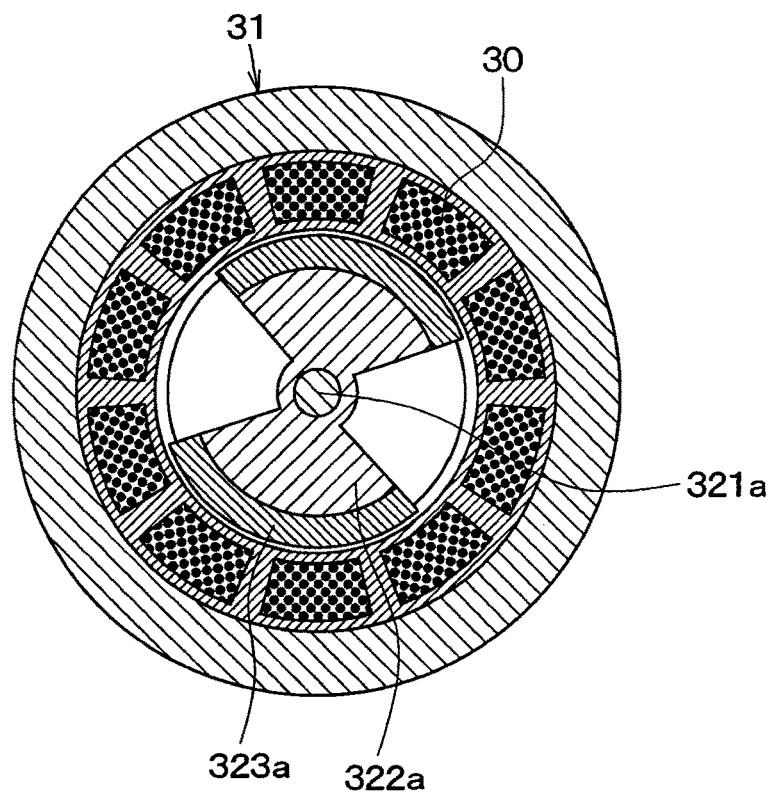
FIG. 17 is a section view taken along a line B-B in FIG. 16.
Figure 18:
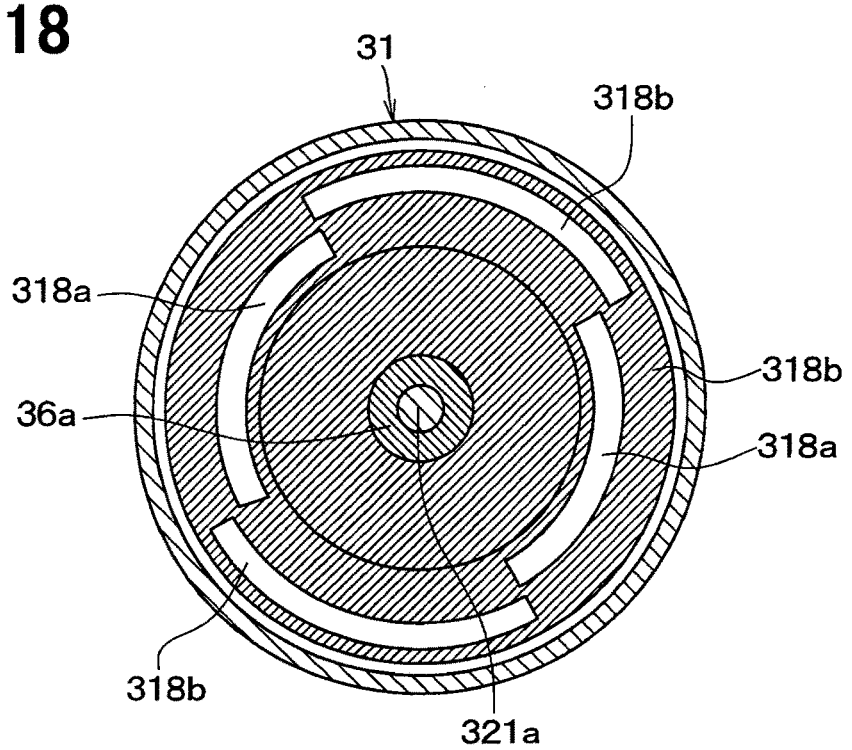
FIG. 18 is a section view taken along a line C-C in FIG. 16.

As shown in FIG. 17 by a section view taken on a line B-B in FIG. 16 and shown in FIG. 18 by a section view taken on a line C-C in FIG. 16, the rotary disk 318 is coupled to the rotary shaft 321a, 321b in such a way as to be rotated by power supplied from the electric motor 35 which is a drive part and is constructed in such a way as to open or close the suction holes 317a and the discharge holes 317b of the valve plate 317 at timings shifted from each other in synchronization with the rotation of the rotary shaft 321a, 321b.

Specifically, the rotary disk 318 has suction side through holes 318a passed through from an obverse to a reverse at positions, which are opposite to the suction holes 317a of the valve plate 317 in the axial direction when the refrigerant is sucked into the working chambers 311. Similarly, the rotary disk 318 has discharge side through holes 318b passed through from an obverse to a reverse at positions, which are opposite to the discharge holes 317b of the valve plate 317 in the axial direction when the refrigerant is discharged from the working chambers 311.

As is the case with the present embodiment, in the case where the respective valves 312c, 312d are constructed of the rotary valve and where the respective valves 313c, 313d are constructed of the rotary valve, it is possible to prevent the refrigerant from remaining around the respective suction valves 312c, 313c. Hence, it is possible to prevent an unnecessary heat exchange between the refrigerant remaining around the suction valve 312c, 313c and the refrigerant discharged from the working chamber 311 via the discharge valve 312d, 313d. In this way, it is possible to reduce a heat exchange loss at the time of transporting the hot heat and the cold heat generated in the magnetic working material 30 and hence to improve the COP of the magnetic refrigeration system.

Further, the present embodiment employs a construction in which the rotary disk 318 of the rotary valve is rotated by the power for driving the magnetic field applying and removing device 32, that is, the power of the electric motor 35, the magnetic refrigeration system can be realized by a simple construction. Still further, the suction valves 312c and the discharge valves 312d can be integrally constructed and the suction valves 313c and the discharge valves 313d can be integrally constructed. Hence, the magnetic refrigeration system can be realized by a further simpler construction.

Tenth Embodiment

In the present embodiment will be described an example in which each of the suction valves 312c, 313c is constructed of a rotary valve and in which each of the discharge valves 312d, 313d is constructed of a reed valve.

Figure 19:
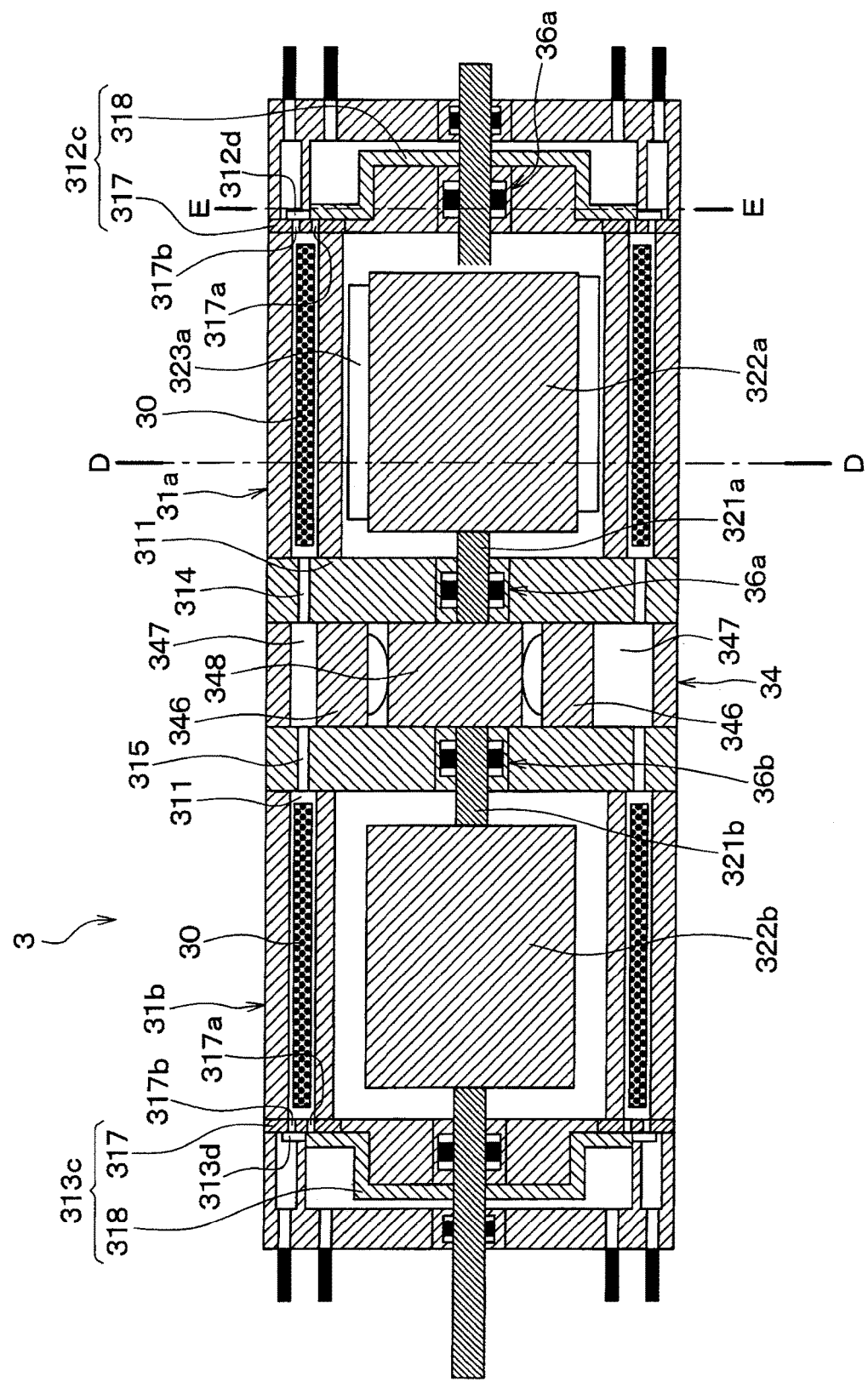
FIG. 19 is an enlarged view illustrating a magnetic refrigerator according to a tenth embodiment.

As shown by an enlarged view of a magnetic refrigerator in FIG. 19, the rotary valve constructing the respective suction valve 312c, 313c is constructed of a valve plate 317 and a rotary disk 318. The valve plate 317 is arranged adjacently to the working chambers 311 and has suction holes 317a each of which communicates with each of the working chambers 311. The rotary disk 318 rotates in a circumferential direction of the heat exchange container 31 and opens or closes the suction holes 317a of the valve plate 317.

Figure 20:
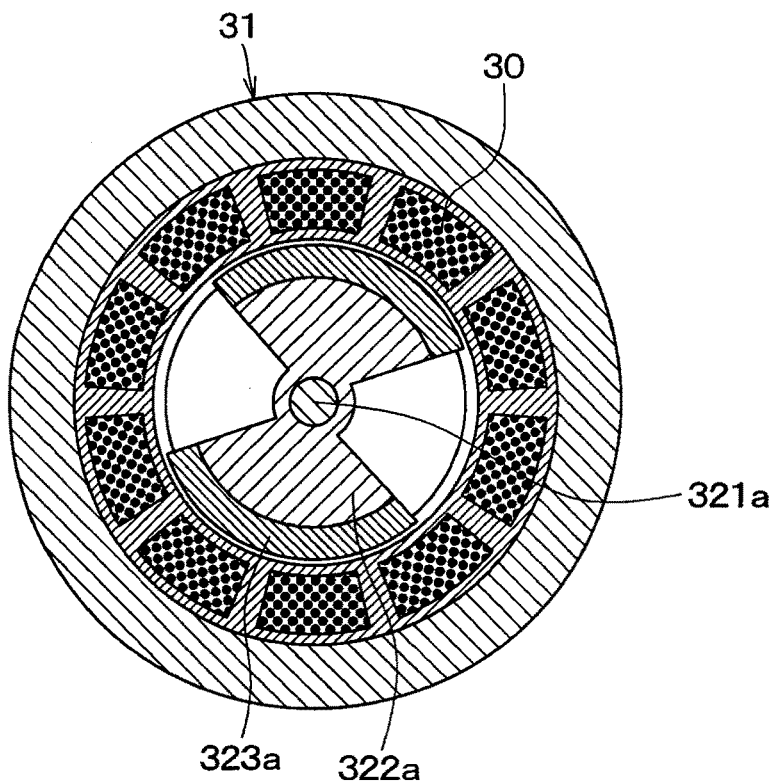
FIG. 20 is a section view taken along a line D-D in FIG. 19.
Figure 21:
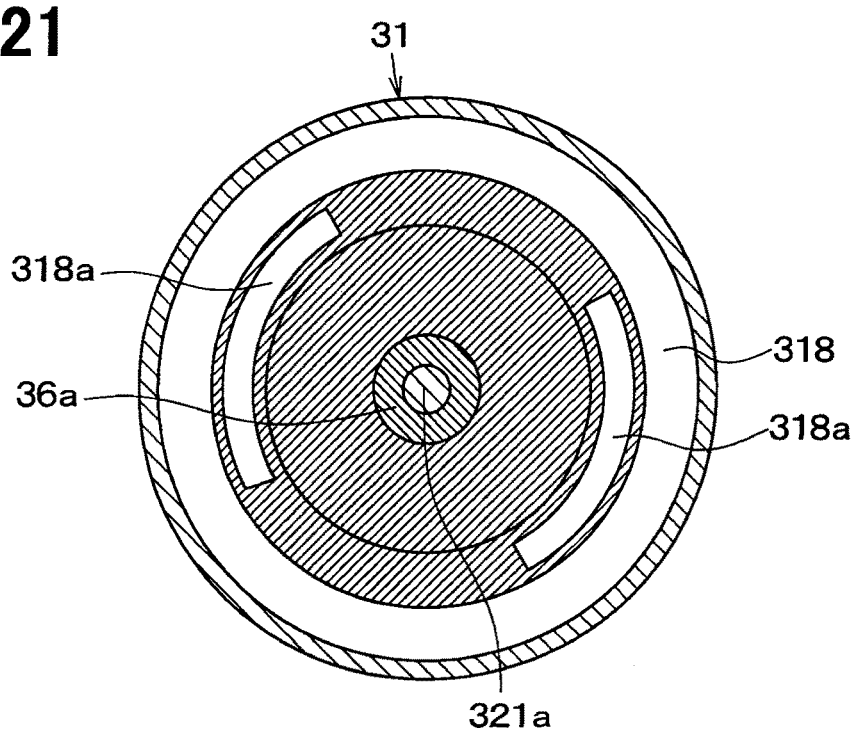
FIG. 21 is a section view taken along a line E-E in FIG. 19.

As shown in FIG. 20 by a section view taken on a line D-D in FIG. 19 and in FIG. 21 by a section view taken on a line E-E in FIG. 19, the rotary disk 318 is coupled to the rotary shaft 321a, 321b in such a way as to be rotated by power supplied from the electric motor 35 corresponding to the drive part and is constructed in such a way as to open or close the suction holes 317a of the valve plate 317 in synchronization with the rotation of the rotary shaft 321a, 321b. In this regard, in the rotary disk 318 are formed suction side through holes 318a each of which is passed through from an obverse to a reverse at a position opposite to the suction hole 317a of the valve plate 317 in the axial direction when the refrigerant is sucked into each of the working chambers 311.

Here, the reed valve constructing the discharge valve 312d, 313d is constructed in such a way as to open or close each of discharge holes 317b formed in the valve plate 317 by an elastic plate member.

As is the case with the present embodiment, even in the case where only the suction valve 312c, 313c is constructed of the rotary valve, it is possible to prevent the refrigerant from remaining around the suction valve 312c, 313c and hence to prevent an unnecessary heat exchange between the refrigerant remaining around the suction valve 312c, 313c and the refrigerant discharged from the working chamber 311 via the discharge valve 312d, 313d. In this way, it is possible to reduce a heat exchange loss at the time of transporting the hot heat and the cold heat generated in the magnetic working material 30 and hence to improve the COP of the magnetic refrigeration system.

11th Embodiment

The first and the second backward flow preventing parts are respectively constructed of the check valves 44, 45 and 56, 57 in the second and the sixth embodiments. Alternatively, each of the first and the second backward flow preventing parts may be constructed of a fluid diode in which resistance is smaller in a forward direction of a refrigerant flow than in a backward direction of the refrigerant flow. According to this construction, the magnetic refrigeration system can be realized by a simple construction. Here, one of the first and the second backward flow preventing parts may be constructed of a fluid diode 71, 72.

Here, as the fluid diode can be employed a nozzle type fluid diode 71 or a vortex type fluid diode 72.

Figure 22:
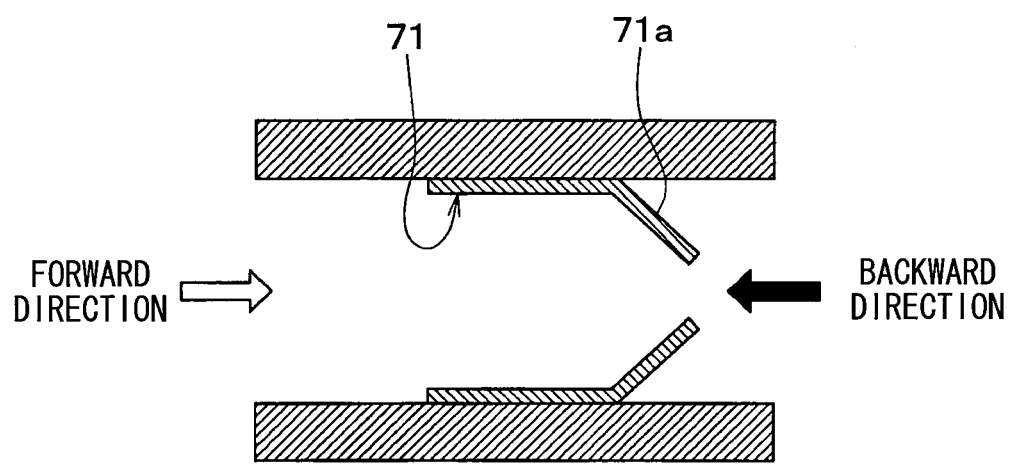
FIG. 22 is a schematic section view illustrating a nozzle type fluid diode according to an 11th embodiment.

FIG. 22 is a schematic section view of the nozzle type fluid diode 71. The nozzle type fluid diode 71 is constructed of a cylindrical member and, as shown in FIG. 22, is constructed of a tapered part 71a whose size is decreased in a conical shape from an upstream side of a refrigerant flow to a downstream side of the refrigerant flow in a refrigerant flow passage.

In this nozzle type fluid diode 71, resistance at the tapered part 71a becomes larger in the case where the refrigerant flows in the backward direction (see a black arrow in the drawing) than in the case where the refrigerant flows in the forward direction (see a white arrow in the drawing).

Figure 23:
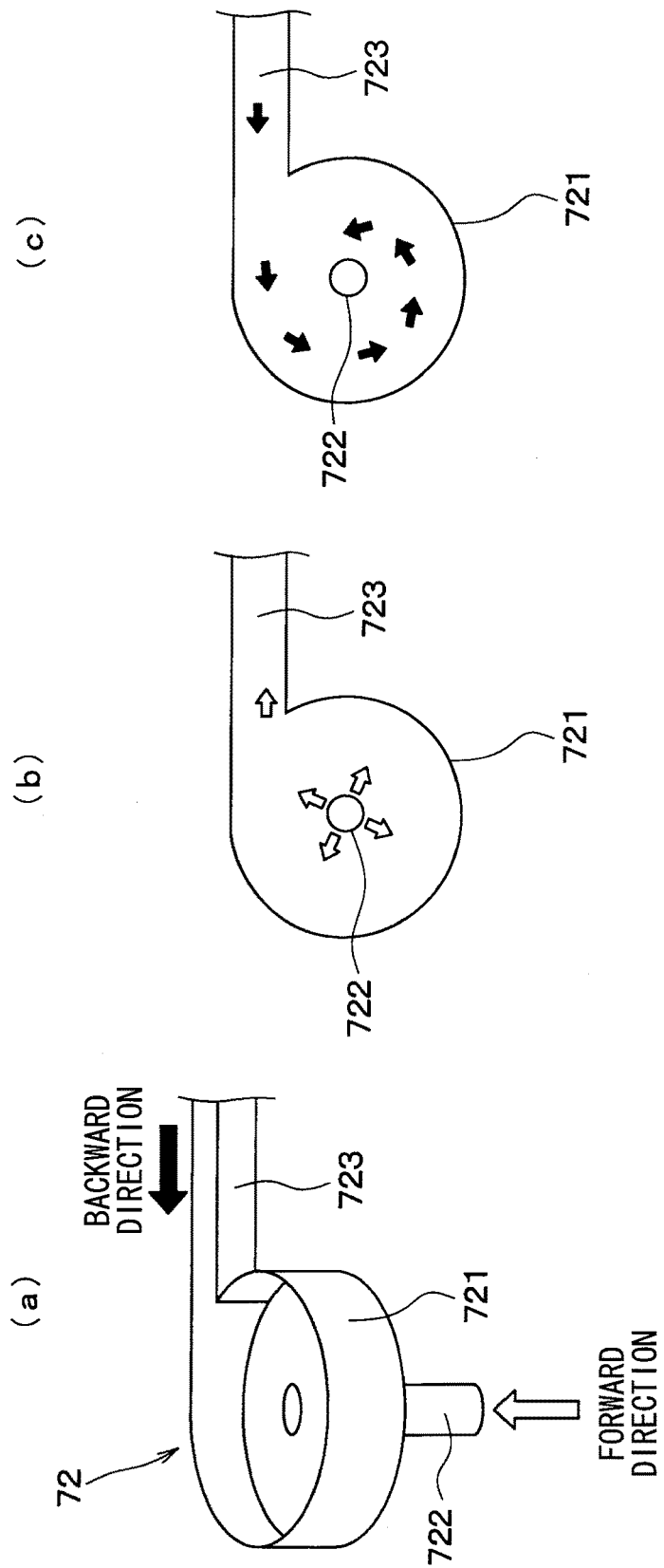
FIG. 23 is an explanatory view illustrating a vortex type fluid diode according to the 11th embodiment.

FIG. 23 is an explanatory view illustrating the vortex type fluid diode 72, in which (a) of FIG. 23 is the schematic perspective view, (b) of FIG. 23 is a top view of (a) illustrating a flow of the refrigerant in the forward direction, and (c) of FIG. 23 is a top view of (b) illustrating a flow of the refrigerant in the backward direction.

The vortex type fluid diode 72, as shown in (a) of FIG. 23, is constructed of a vortex case 721 having a cylindrical vortex chamber formed therein, an axial nozzle 722 extended in a central axis direction of the vortex chamber in the vortex case 721, and a tangent nozzle 723 extended in a tangential direction of an outer circumference of the vortex chamber.

In this vortex type fluid diode 72, in the case where the refrigerant flows from the upstream side to the downstream side of the refrigerant flow, as shown by white arrows in (b) of FIG. 23, the refrigerant from the axial nozzle 722 flows to the tangential nozzle 723 without developing a vortex in the vortex chamber in the vortex case 721.

In contrast to this, in the case where the refrigerant flows from the downstream side to the upstream side of the refrigerant flow, as shown by the black arrows in (c) of FIG. 23, the refrigerant from the tangential nozzle 723 flows vertically in the vortex chamber in the vortex case 721 and then flows into the axial nozzle 722. In this way, in the vortex type fluid diode 72, resistance becomes larger in the case where the refrigerant flows from the downstream side to the upstream side of the refrigerant flow, that is, in the backward direction than in the case where the refrigerant flows from the upstream side to the downstream side of the refrigerant flow, that is, in the forward direction.

Other Embodiments

While the embodiments of the present disclosure have been described above, the present disclosure is not limited to these embodiments. The present disclosure is not limited by the wording as claimed in the respective claims but includes a scope replaced easily from the claims by persons skilled in the art as far as the scope does not depart from the scope as claimed in the claims and can have modifications added thereto as appropriate, the modifications being made on the basis of knowledge acquired by the persons skilled in the art. For example, the present disclosure can be modified variously in the following manner.

(A) In the respective embodiments described above, the magnetic field generating part of the magnetic field applying and removing device 32 is constructed of the permanent magnets 323a, 323b. However, the magnetic field generating part is not limited to this but may be constructed of an electric magnet for generating a magnetic field when current is applied thereto.

(B) Like the respective embodiments described above, it is desirable that the drive sources of the refrigerant pump 34 and the magnetic field applying and removing device 32 are constructed of one electric motor 35. However, the drive sources of the refrigerant pump 34 and the magnetic field applying and removing device 32 may be constructed of separate drive sources.

Further, like the ninth and the tenth embodiments, it is desirable that the drive sources of the respective valves 312c, 313c, 312d, 313d and the magnetic field applying and removing device 32 are constructed of one electric motor 35. However, the respective drive sources may be constructed of separate drive sources.

(C) In the respective embodiments, the magnetic refrigeration system 2 is applied to the vehicle air conditioning device 1. However, the magnetic refrigeration system 2 is not limited to this but may be applied to the other device.

(D) The respective embodiments described above can be combined with each other within a possible scope.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A magnetic refrigeration system comprising:
a cylindrical container having a plurality of working chambers formed therein radially in a circumferential direction, the plurality of working chambers having a magnetic working material having a magnetocaloric effect arranged therein and having refrigerant flowing therethrough, the cylindrical container having one refrigerant port and another refrigerant port respectively on end faces in a longitudinal direction;
a magnetic field applying and removing part which repeats applying and removing a magnetic field to and from the magnetic working material;
a first refrigerant circulation circuit constructed in such a way that the refrigerant flowing out of a first refrigerant discharge part of the one refrigerant port flows through a first heat exchanger and returns to a first refrigerant suction part of the one refrigerant port;
a second refrigerant circulation circuit constructed in such a way that the refrigerant flowing out of a second refrigerant discharge part of the another refrigerant port flows through a second heat exchanger and returns to a second refrigerant suction part of the another refrigerant port;
a refrigerant transfer part which transfers the refrigerant between the first refrigerant discharge part and the first refrigerant suction part of the one refrigerant port and between the second refrigerant discharge part and the second refrigerant suction part of the another refrigerant port;
a suction valve provided to each of the first refrigerant suction part and the second refrigerant suction part and opened when the refrigerant is sucked into the working chambers;
a discharge valve provided to each of the first refrigerant discharge part and the second refrigerant discharge part and opened when the refrigerant is discharged from the working chambers; and
a plate-shaped valve plate having a suction hole and a discharge hole, the plate-shaped valve plate being arranged at a position adjacent to the working chambers;
wherein:
after the magnetic field is applied to the magnetic working material by the magnetic field applying and removing part, the refrigerant transfer part transfers the refrigerant from the another refrigerant port to the one refrigerant port,
after the magnetic field is removed from the magnetic working material by the magnetic field applying and removing part, the refrigerant transfer part transfers the refrigerant from the one refrigerant port to the another refrigerant port, and
the discharge valve is arranged at a position nearer to the working chambers than the suction valve is in the longitudinal direction of the container.

2. The magnetic refrigeration system according to claim 1, wherein
of the suction valve and the discharge valve, at least the suction valve is constructed of a rotary valve having the plate-shaped valve plate and a rotary disk, the plate-shaped valve plate having a communication hole communicating with interior of the working chambers, the rotary disk rotating in a circumferential direction of the container to thereby open or close the communication hole.

3. The magnetic refrigeration system according to claim 2, wherein the rotary valve is constructed in such a way that the rotary disk rotates by power for driving the magnetic field applying and removing part.

4. The magnetic refrigeration system according to claim 1, wherein
each of the first refrigerant suction part and the second refrigerant suction part is one of a plurality of refrigerant suction parts disposed in correspondence to the plurality of working chambers, each of the first refrigerant discharge part and the second refrigerant discharge part is one of a plurality of refrigerant discharge parts disposed in correspondence to the plurality of working chambers, the plurality of refrigerant suction parts are positioned on a same circumference when viewed from the longitudinal direction of the container, and the plurality of refrigerant discharge parts are positioned on a same circumference when viewed from the longitudinal direction of the container.

5. The magnetic refrigeration system according to claim 1, wherein
the discharge valve is arranged at a position adjacent to the plate-shaped valve plate, and
the suction valve is arranged at a position away from the plate-shaped valve plate by a distance more than a movable range of the suction valve.

6. The magnetic refrigeration system according to claim 1, wherein
the discharge valve is configured to directly open or close the discharge hole of the plate-shaped valve plate, and
the suction valve is configured to indirectly open or close the suction hole of the plate-shaped valve plate.

7. The magnetic refrigeration system according to claim 1, wherein the plate-shaped valve plate has a suction hole corresponding to the suction valve and a discharge hole corresponding to the discharge valve, and a distance between the suction hole and the suction valve is larger than a distance between the discharge hole and the discharge valve.

8. The magnetic refrigeration system according to claim 1, wherein the longitudinal direction of the cylindrical container corresponds to an axis of the cylindrical container that is perpendicular to the end faces of the cylindrical container.

9. A magnetic refrigeration system comprising:
a cylindrical container having a plurality of working chambers formed therein radially in a circumferential direction, the plurality of working chambers having a magnetic working material having a magnetocaloric effect arranged therein and having refrigerant flowing therethrough, the cylindrical container having a first refrigerant port and a second refrigerant port respectively on end faces of the cylindrical container, the first refrigerant port and the second refrigerant port each having an associated working chamber of the plurality of working chambers;
a magnetic field applying and removing part configured to apply and remove a magnetic field to and from the magnetic working material;
a first heat exchanger configured to receive the refrigerant from a first refrigerant discharge part of the first refrigerant port and to return the refrigerant to a first refrigerant suction part of the first refrigerant port;
a second heat exchanger configured to receive refrigerant from a second refrigerant discharge part of the second refrigerant port and to return refrigerant to a second refrigerant suction part of the second refrigerant port;
a refrigerant pump configured to (i) transfer the refrigerant between the first refrigerant discharge part and the first refrigerant suction part of the first refrigerant port and between the second refrigerant discharge part and the second refrigerant suction part of the second refrigerant port, (ii) transfer the refrigerant from the second refrigerant port to the first refrigerant port after the magnetic field is applied to the magnetic working material by the magnetic field applying and removing part, and (iii) transfer the refrigerant from the first refrigerant port to the second refrigerant port after the magnetic field is removed from the magnetic working material by the magnetic field applying and removing part; and
a suction valve, a discharge valve, and a plate-shaped valve plate associated with each of the first refrigerant port and the second refrigerant port;
the suction valve being configured to open when the refrigerant is sucked into the associated working chamber through a suction hole of the plate-shaped valve plate, the suction valve being located at a distance away from the plate-shaped valve plate that is greater than a movable range of the suction valve such that the suction valve does not contact the plate-shaped valve plate when the suction valve is opened or closed; and
the discharge valve being configured to open when the refrigerant is discharged from the associated working chamber through a discharge hole of the plate-shaped valve plate, the discharge valve being adjacent to the plate-shaped valve plate such that the discharge valve contacts the plate-shaped valve plate when the discharge valve is closed.

10. The magnetic refrigeration system according to claim 9, wherein the suction valve is a reed valve constructed of an elastic plate member having one end fixed and the elastic plate member does not contact the plate-shaped valve plate when the suction valve is opened or closed.

11. The magnetic refrigeration system according to claim 9, wherein the discharge valve is a reed valve constructed of an elastic plate member having one end fixed and the elastic plate member contacts the plate-shaped valve plate when the discharge valve is closed.

* * * * *